(12) United States Patent
Akita

(10) Patent No.: US 7,500,469 B2
(45) Date of Patent: Mar. 10, 2009

(54) CONTROL APPARATUS OF VEHICLE

(75) Inventor: Tatsuhiko Akita, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 42 days.

(21) Appl. No.: 11/402,891

(22) Filed: Apr. 13, 2006

(65) Prior Publication Data

US 2006/0254562 A1  Nov. 16, 2006

(30) Foreign Application Priority Data

Apr. 14, 2005  (JP) .............................. 2005-116722

(51) Int. Cl.
*F02D 41/30* (2006.01)

(52) U.S. Cl. ....................... 123/431; 701/110

(58) Field of Classification Search ................. 123/431, 123/299, 300, 305, 399, 352, 492, 319, 339.1; 701/110

See application file for complete search history.

(56) References Cited

U.S. PATENT DOCUMENTS

| | | | | | |
|---|---|---|---|---|---|
| 5,127,378 | A | * | 7/1992 | Ito | 123/300 |
| 6,138,638 | A | * | 10/2000 | Morikawa | 123/295 |
| 6,440,037 | B2 | * | 8/2002 | Takagi et al. | 477/37 |
| 6,659,071 | B2 | * | 12/2003 | LaPointe et al. | 123/299 |
| 6,745,743 | B2 | * | 6/2004 | Abo et al. | 123/295 |
| 7,063,070 | B2 | * | 6/2006 | Mashiki | 123/431 |
| 7,124,737 | B2 | | 10/2006 | Sadakane et al. | |
| 7,128,053 | B2 | * | 10/2006 | Tokuda et al. | 123/429 |
| 7,321,821 | B2 | * | 1/2008 | Kolmanovsky et al. | 701/110 |
| 2002/0007816 | A1 | | 1/2002 | Loye et al. | |
| 2003/0168037 | A1 | | 9/2003 | Loye et al. | |
| 2005/0051135 | A1 | | 3/2005 | Tomoda et al. | |

FOREIGN PATENT DOCUMENTS

| | | |
|---|---|---|
| EP | 1 515 031 A 2 | 3/2005 |
| JP | A 4-132857 | 5/1992 |
| JP | A-05-179977 | 7/1993 |
| JP | A 7-103051 | 4/1995 |
| JP | A-07-293381 | 11/1995 |
| JP | A-2001-041088 | 2/2001 |
| JP | A-2001-050095 | 2/2001 |
| JP | A-2002-364409 | 12/2002 |
| JP | A 2004-60474 | 2/2004 |
| JP | A-2005-048626 | 2/2005 |

* cited by examiner

*Primary Examiner*—Willis R. Wolfe, Jr.
*Assistant Examiner*—Johnny H. Hoang
(74) *Attorney, Agent, or Firm*—Oliff & Berridge, PLC

(57) ABSTRACT

A hybrid vehicle has, as its driving-force source, an internal combustion engine that includes an in-cylinder injector directly injecting fuel into a cylinder and an intake manifold injector injecting fuel into an intake manifold and/or an intake port as well as another driving-force source. When the internal combustion engine is operated in such an operation state as the low-vehicle-speed running state where the sound generated from the whole vehicle is low in volume, the fuel injection ratio between the injectors is set so that the total fuel quantity is injected by the intake manifold injector, without using the in-cylinder injector that injects fuel at a high pressure. In this way, the operating sound of the internal combustion engine can be reduced in the operation state where the sound generated from the whole vehicle is low in volume.

13 Claims, 12 Drawing Sheets

CONTROL APPARATUS OF VEHICLE

This nonprovisional application is based on Japanese Patent Application No. 2005-116722 filed with the Japan Patent Office on Apr. 14, 2005, the entire contents of which are hereby incorporated by reference.

BACKGROUND OF THE INVENTION

1. Field of the Invention

The present invention relates to a control apparatus of a vehicle. In particular, the invention relates to fuel injection control for a vehicle having, as its driving-force sources, an electric motor and an internal combustion engine having a first fuel injection mechanism for injecting fuel directly into a cylinder (in-cylinder injector) and a second fuel injection mechanism for injecting fuel into an intake manifold and/or an intake port (intake manifold injector).

2. Description of the Background Art

As one form of the internal combustion engine, a configuration of the internal combustion engine having an in-cylinder injector injecting fuel directly into a combustion chamber is proposed. In order to sufficiently atomize the fuel injected directly into the combustion chamber, it is necessary to set the pressure of the fuel injected from the in-cylinder injector to a higher pressure than the pressure of fuel injected from the intake manifold injector. To this end, generally a configuration is employed that uses a fuel-pressure boost system including an engine-driven high-pressure fuel pump which is driven according to rotations of the internal combustion engine, so as to increase the pressure of fuel of a low-pressure fuel supply system supplying fuel to be injected from the intake manifold injector. The resultant pressure-increased fuel is supplied as fuel to be injected from the in-cylinder injector.

Japanese Patent Laying-Open No. 2001-41088 (hereinafter Patent Document 1) and Japanese Patent Laying-Open No. 2001-50095 (hereinafter Patent Document 2) disclose that operation (particularly intermittent operation) of a spill valve functioning as a valve for adjusting the quantity of fuel whose pressure is increased by a high-pressure fuel pump causes an operating sound that could be felt unusual by a driver.

Further, a configuration is also proposed of an internal combustion engine having both of the above-described in-cylinder injector and intake manifold injector (see for example Japanese Patent Laying-Open No. 2002-364409, hereinafter Patent Document 3). Patent Document 3 discloses that such an internal combustion engine in a homogeneous-combustion operating mode injects fuel by both of the in-cylinder injector and the intake manifold injector for the purpose of preventing the in-cylinder injector from being kept at a high temperature.

Furthermore, in recent years, as a motor vehicle superior in fuel consumption and environmental performance, a hybrid vehicle has been developed having as its driving-force sources an internal combustion engine and an electric motor. In particular, the hybrid vehicle employs the configuration having a secondary battery and using electric power generated by the electric motor in a regenerative braking operating mode as well as the electric power generated by the electric generator driven by an engine output so as to charge the battery.

Thus, for the hybrid vehicle, whether or not the internal combustion engine is to be operated or stopped is determined in consideration of such factors as a required driving force for the whole vehicle as well as a request to charge battery. Generally, in a light-load running mode, the hybrid vehicle generates the vehicle's driving force by means of the electric motor only, for avoiding the use of the internal combustion engine in a low-efficient region. Even in such a case, however, if the battery charge quantity decreases, the internal combustion engine is started for charging the battery and operated in an idle mode. In this state, since the sound generated from the whole vehicle is low in volume, a driver is likely to sense the operating sound of the internal combustion engine. In particular, an internal combustion engine having the in-cylinder injector mounted thereon could generate the operating sound of the fuel-pressure boost system that is felt uncomfortable or unusual by the driver, as described in Patent Documents 1 and 2.

Accordingly, in the case where the internal combustion engine having the in-cylinder injector and the intake manifold injector like the one disclosed in Patent Document 3 is mounted on the hybrid vehicle, it is necessary to control the fuel injection while addressing the issue of deposit build-up due to an increase in temperature of the in-cylinder injector and giving consideration to the driver's sensibility to noise.

SUMMARY OF THE INVENTION

An object of the present invention is to provide a control apparatus of a vehicle having, as its driving-force source, an internal combustion engine that includes first fuel injection means (mechanism) for directly injecting fuel into a cylinder (in-cylinder injector) and second fuel injection means (mechanism) for injecting fuel into an intake manifold and/or intake port (intake manifold injector) as well as an electric motor for example as another driving-force source, to implement fuel injection control with which the operating sound of the internal combustion engine is reduced in an operation state where the sound generated from the whole vehicle is low in volume.

A control apparatus of a vehicle according to an aspect of the present invention is a control apparatus of a vehicle including, as its driving-force sources, an electric motor and an internal combustion engine that includes a first fuel injection mechanism directly injecting fuel into a cylinder and a second fuel injection mechanism injecting fuel into an intake manifold. The control apparatus includes a vehicle speed determination portion and a first fuel injection control portion. The vehicle speed determination portion determines, when a request to operate the internal combustion engine is made, whether or not the vehicle speed is lower than a predetermined speed. The first fuel injection control portion controls, when the vehicle speed determination portion determines that the vehicle speed is lower than the predetermined speed, fuel injection ratio between the first fuel injection mechanism and the second fuel injection mechanism with respect to a total fuel injection quantity of the internal combustion engine, so as to inject the total fuel quantity from the second fuel injection mechanism.

The above-described control apparatus of the vehicle controls fuel injection in the following manner. When the internal combustion engine is operated in such an operation state as a low-vehicle-speed running state where the sound generated from the entire vehicle is low in volume, fuel injection at a high pressure into the cylinder is not performed. Instead, all fuel is injected from the second fuel injection mechanism (intake manifold injector) that injects fuel at a relatively low pressure. Thus, the operation of the fuel-pressure boost system for supplying high-pressure fuel to the first fuel injection mechanism (in-cylinder injector) can be stopped. Therefore, when the vehicle is running at a low speed and accordingly the operating sound of the internal combustion engine is likely to be sensed by the driver, the operating sound of the internal combustion engine can be reduced to prevent the driver from feeling the sound uncomfortable or unusual. It is noted that the predetermined value used by the vehicle speed determination portion can be defined to correspond to idle operation which is performed without accelerator manipulation by the driver and by which the vehicle can be driven by only the output of the electric motor.

A control apparatus of a vehicle according to another aspect of the present invention is a control apparatus of a vehicle including, as its driving-force sources, an electric motor and an internal combustion engine that includes a first fuel injection mechanism directly injecting fuel into a cylinder and a second fuel injection mechanism injecting fuel into an intake manifold. The vehicle further includes a battery that is chargeable with electric power generated from an output of the internal combustion engine and that is usable as a power supply of the electric motor. The control apparatus includes an operation request determination portion and a first fuel injection control portion. The operation request determination portion determines, when a request to operate the internal combustion engine is made, whether or not a requested output requested to the internal combustion engine that is to be provided as a driving force of the vehicle is less than a predetermined value. The first fuel injection control portion controls, when the operation request determination portion determines that the requested output requested to the internal combustion engine that is to be provided as a driving force of the vehicle is less than the predetermined value, fuel injection ratio between the first fuel injection mechanism and the second fuel injection mechanism with respect to a total fuel injection quantity of the internal combustion engine, so as to inject the total fuel quantity from the second fuel injection mechanism.

Preferably, the first fuel injection control portion sets, when the request to operate the internal combustion engine is made for charging the battery, the fuel injection ratio so as to inject the total fuel quantity from the second fuel injection mechanism.

The above-described control apparatus of the vehicle controls fuel injection in the following manner. When the internal combustion engine is operated in such an operation state where the internal combustion engine is requested to operate not for the purpose of generating the driving force of the vehicle and where the sound generated from the entire vehicle is low in volume, fuel injection at a high pressure into the cylinder is not performed. Instead, all fuel is injected from the second fuel injection mechanism (intake manifold injector) that injects fuel at a relatively low pressure. Thus, the operation of the fuel-pressure boost system for supplying high-pressure fuel to the first fuel injection mechanism (in-cylinder injector) can be stopped. Therefore, when the vehicle is driven in a state where the operating sound of the internal combustion engine is likely to be sensed by the driver (typically when the internal combustion engine is operated in response to a request to charge the battery), the operating sound of the internal combustion engine can be reduced to prevent the driver from feeling the sound uncomfortable or unusual.

Preferably, the control apparatus of the vehicle according to the present invention further includes a temperature determination portion and a second fuel injection control portion. The temperature determination portion determines whether or not the temperature of the first fuel injection mechanism is higher than a predetermined temperature. The second fuel injection control portion sets, when the temperature determination portion determines that the temperature of the first fuel injection mechanism is higher than the predetermined temperature, the fuel injection ratio on behalf of the first fuel injection control portion. In particular, the second fuel injection control portion sets the fuel injection ratio so as to inject at least a part of the total fuel injection quantity from the first fuel injection mechanism. In particular, the predetermined temperature used by the temperature determination portion is set in consideration of a risk of deposit build-up of the first fuel injection mechanism.

The above-described control apparatus of the vehicle controls fuel injection in the following manner. When the internal combustion engine is operated in such an operation state where the sound generated from the entire vehicle is low in volume, basically the fuel injection is controlled so that all fuel is injected from the second fuel injection mechanism (intake manifold injector). Further, when the temperature of the first fuel injection mechanism (in-cylinder injector) increases, the fuel injection ratio is set so that at least a part of the total fuel injection quantity is injected from the first fuel injection mechanism so as to ensure fuel injection from the first fuel injection mechanism. Thus, latent heat of vaporization of the fuel injected from the first fuel injection mechanism can be used to cool the first fuel injection mechanism. Accordingly, it is prevented that the first fuel injection mechanism has an excessively high temperature to cause deposit build-up which eventually results in injector clogging. Further, the operating sound of the internal combustion engine can be reduced.

Still preferably, regarding the control apparatus of the vehicle of the present invention, the vehicle further includes: a fuel tank storing fuel; a first fuel pump drawing in the fuel stored in the fuel tank and discharging the fuel at a predetermined pressure corresponding to a fuel injection pressure from the second fuel injection mechanism; and a second fuel pump drawing in the fuel discharged from the first fuel pump and increasing the predetermined pressure to discharge the fuel at the increased pressure. Further, fuel injection from the first fuel injection mechanism according to the second fuel injection control portion is carried out at the predetermined pressure in a state where the second fuel pump is stopped.

The above-described control apparatus of the vehicle performs control in the following manner. When the temperature of the first fuel injection mechanism (in-cylinder injector) increases, the second fuel pump (high-pressure fuel pump) does not perform pressure-increasing operation. Instead, the pressure (low pressure) provided from the first fuel pump is used to perform fuel injection from the first fuel injection mechanism. Thus, an increase in operating sound of the internal combustion engine caused by the operation of the second fuel pump is avoided. The fuel is injected from the first fuel injection mechanism to obtain the cooling effect. It is noted that, when the vehicle is running at a low speed or the requested output of the internal combustion engine that is requested to the engine as the driving force of the vehicle is small (idle operation), the main purpose of the operation of the internal combustion engine is not to provide the vehicle driving force. Therefore, even if the output of the internal combustion engine decreases due to the fuel injection at a low pressure from the first fuel injection mechanism, the operating performance does not deteriorate.

Still preferably, the control apparatus of the vehicle of the present invention further includes a temperature determination portion and a combustion stop portion. The temperature determination portion determines whether or not the first fuel injection mechanism has its temperature that is higher than a predetermined temperature. The combustion stop portion forces fuel injection from the first fuel injection mechanism and the second fuel injection mechanism to stop, when the temperature determination portion determines that the first fuel injection mechanism has its temperature that is higher than the predetermined temperature. In particular, the predetermined temperature used by the temperature determination portion is set in consideration of a risk of deposit build-up of the first fuel injection mechanism.

The above-described control apparatus of the vehicle controls fuel injection in the following manner. When the internal combustion engine is operated in such an operation state where the sound generated from the entire vehicle is low in volume, basically the fuel injection is controlled so that the whole fuel quantity is injected from the second fuel injection mechanism (intake manifold injector). Further, when the temperature of the first fuel injection mechanism (in-cylinder injector) increases, fuel injection from each fuel injection mechanism (injector) is stopped to stop combustion. Thus, an increase in temperature of the first fuel injection mechanism can be suppressed. Accordingly, it is prevented that the first fuel injection mechanism has an excessively high temperature to cause deposit build-up which eventually results in injector clogging. Further, the operating sound of the internal combustion engine can be reduced. It is noted that, when the vehicle is running at a low speed or the requested output of the internal combustion engine that is requested to the engine as the driving force of the vehicle is small (idle operation), the main purpose of the operation of the internal combustion engine is not to provide the vehicle's driving force. Therefore, even if the combustion of the internal combustion engine is stopped, the operating performance does not deteriorate.

As seen from the above, the present invention is chiefly advantageous in that, for the vehicle having as its driving-force source an internal combustion engine that includes a first fuel injection mechanism for directly injecting fuel into a cylinder (in-cylinder injector) and a second fuel injection mechanism for injecting fuel into an intake manifold and/or intake port (intake manifold injector) as well as an electric motor for example as another driving-force source, the fuel injection can be controlled so that the operating sound of the internal combustion engine is reduced in such an operation state where the sound generated from the entire vehicle is low in volume.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
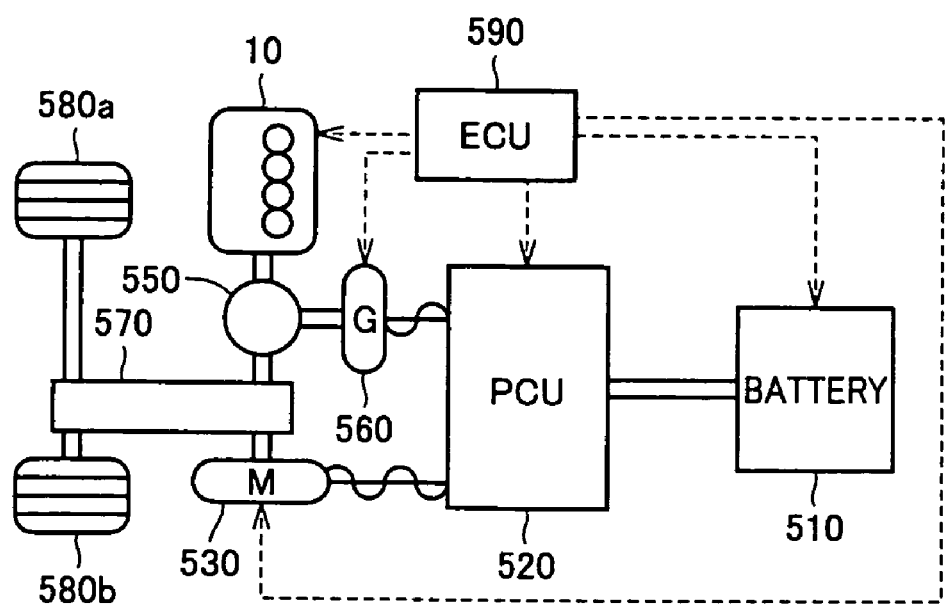
FIG. 1 is a schematic block diagram illustrating an entire configuration of a hybrid vehicle controlled by a control apparatus of the vehicle according to an embodiment of the present invention.

In the following, embodiments of the present invention are described in detail with reference to the drawings. It is noted that like or corresponding components in the drawings will be denoted by like reference characters and a description thereof will not be repeated where appropriate.

First Embodiment

FIG. 1 is a schematic block diagram illustrating the entire configuration of a hybrid vehicle 500 controlled by a control apparatus of the vehicle according to an embodiment of the present invention.

Referring to FIG. 1, hybrid vehicle 500 includes, in addition to an engine 10, a battery 510, a power control unit (PCU) 520 for conveying power, an electric motor 530, a power split device 550, an electric generator (generator) 560, a reduction gear 570, drive wheels 580a, 580b, and a hybrid ECU (Electronic Control Unit) 590 that controls overall operation of hybrid vehicle 500. Although FIG. 1 shows the hybrid vehicle whose drive wheels are only the front wheels, another electric motor for driving the rear wheels may be provided to implement a 4-WD hybrid vehicle.

Battery 510 is configured with a rechargeable secondary battery (for example nickel-hydrogen or lithium-ion secondary battery). PCU 520 includes an inverter (not shown) for converting a direct-current (DC) voltage supplied from battery 510 into an alternating-current (AC) voltage for driving electric motor 530. The inverter is configured to be able to make bidirectional electric-power conversion and also has the function of converting electric power (AC voltage) generated by regenerative braking operation of electric motor 530 as well as electric power (AC voltage) generated by generator 560 into a DC voltage for charging battery 510.

Further, PCU 520 may also include a step up-and-down converter (not shown) performing level conversion of the DC voltage. Such a step up-and-down converter can be provided to drive electric motor 530 by an AC voltage having the amplitude of a higher voltage than the supply voltage of battery 510, and thus the motor drive efficiency can be improved.

Figure 2:
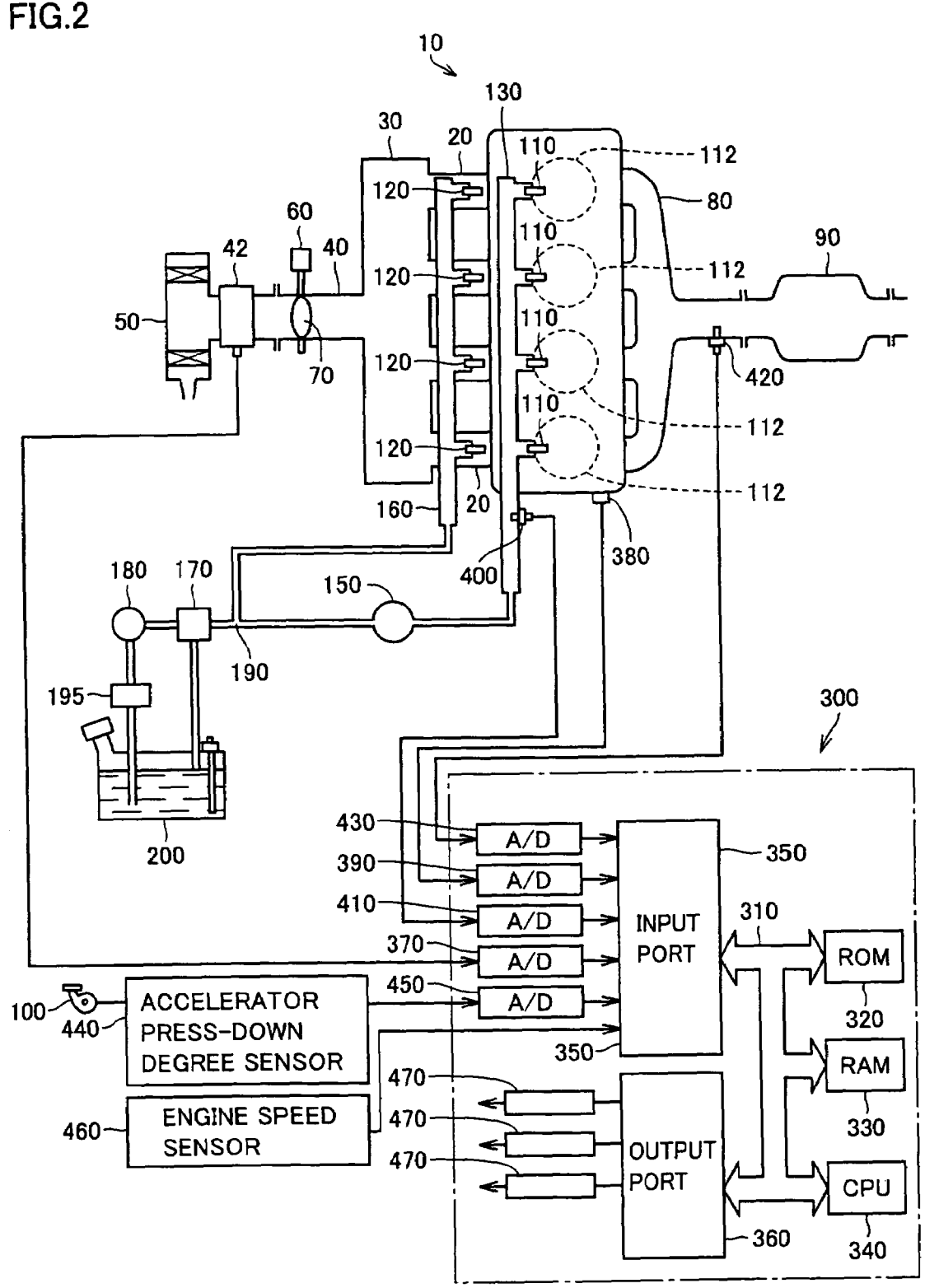
FIG. 2 is a schematic block diagram illustrating a configuration of an engine shown in FIG. 1.

As engine (internal combustion engine) 10, an engine system shown in FIG. 2 and described hereinlater in detail is applied.

Power split device 550 can split and transmit the driving force generated by the engine through a path extending to drive wheels 580a, 580b via reduction gear 570 and through a path extending to generator 560. Generator 560 is rotated by the driving force transmitted from engine 10 via power split device 550 to generate electric power. The electric power generated by generator 560 is used by PCU 520, as the charging power for battery 510, or as the driving electric power for electric motor 530.

Electric motor 530 is rotated and driven by the AC voltage supplied from PCU 520. The driving force of electric motor 530 is transmitted via reduction gear 570 to drive wheels 580a, 580b, to serve as the vehicle's driving force. In the regenerative braking operation mode in which electric motor 530 is rotated as drive wheels 580a, 580b are reduced in speed, electric motor 530 functions as an electric-power generator.

When hybrid vehicle 500 is in a light-load state, for example, when the vehicle starts running, the vehicle is running at a low speed or climbing a moderate slope, the hybrid vehicle runs with the driving force from electric motor 530, rather than the driving force from engine 10, so as to avoid a low-efficiency region of the engine. Therefore, in this case, operation of engine 10 is stopped unless warm-up operation is necessary or the engine has to be operated for charging the battery. When such warm-up operation or the battery charging is required, engine 10 is operated in idle state.

In a normal running state, engine 10 is started and the driving force that is output from engine 10 is split by power split device 550 into the driving force of drive wheels 580a, 580b and the driving force for generating electric power by generator 560. The electric power generated by generator 560 is used to drive electric motor 530. Thus, in the normal running state, the driving force by electric motor 530 assists the driving force by engine 10 to drive the drive wheels 580a, 580b. Hybrid ECU 590 controls the power split ratio of power split device 550 such that the overall efficiency is maximized. Further, in an acceleration mode of full throttle, the electric power supplied from battery 510 is further used for driving electric motor 530, so that the force for driving drive wheels 580a, 580b further increases.

Upon speed reduction and braking, electric motor 530 is rotated and driven by drive wheels 580a, 580b, to generate electric power. The electric power collected by regenerative power generation of electric motor 530 is converted into a DC voltage by PCU 520, and is used for charging battery 510. When the vehicle is stopped, engine 10 is automatically stopped.

As described above, hybrid vehicle 500 uses a combination of the driving force generated by engine 10 and the driving force generated by electric motor 530 from electric energy, specifically, controls the operation of engine 10 and the operation of electric motor 530 according to the state of the vehicle, and thereby achieves vehicle operation improved in fuel efficiency. More specifically, hybrid ECU 590 controls the output ratio between electric motor 530 and engine 10 according to the operation state.

FIG. 2 is a schematic block diagram illustrating a configuration of engine 10 shown in FIG. 1. Engine 10 shown in FIG. 1 is controlled by an engine ECU that is an internal-combustion-engine control apparatus according to the embodiment of the present invention. It is noted that while FIG. 2 shows, as the engine, a series four-cylinder gasoline engine, the present invention is not limited to such an engine.

As shown in FIG. 2, engine (internal combustion engine) 10 includes four cylinders 112 and each cylinder 112 is connected via a corresponding intake manifold 20 to a common surge tank 30. Surge tank 30 is connected via an intake duct 40 to an air cleaner 50. In intake duct 40, an airflow meter 42 and a throttle valve 70 which is driven by an electric motor 60 are disposed. Throttle valve 70 has its degree of opening controlled based on an output signal of an engine ECU 300, independently of an accelerator pedal 100. Cylinders 112 are connected to a common exhaust manifold 80, which is in turn connected to a three-way catalytic converter 90.

For each cylinder 112, an in-cylinder injector 110 for injecting fuel into the cylinder and an intake manifold injector 120 for injecting fuel into an intake port and/or an intake manifold are provided. These injectors 110, 120 are controlled based on output signals of engine ECU 300.

It is noted that while the description in the present embodiment is given concerning the internal combustion engine having two types of injectors provided separately, the present invention is not limited to such an internal combustion engine. For example, the internal combustion engine of the present invention may be an internal combustion engine having one type of injector with both of the in-cylinder injection capability and the intake-manifold injection capability.

Intake manifold injectors 120 are each connected to a common low-pressure fuel delivery pipe 160, and connected to an electric-motor-driven low-pressure fuel pump 180 via fuel delivery pipe 160, a low-pressure fuel channel 190 and a fuel-pressure regulator 170. Further, low-pressure fuel pump 180 is connected via a fuel filter 195 to a fuel tank 200. Fuel-pressure regulator 170 is configured to return a part of the fuel discharged from low-pressure fuel pump 180 back to fuel tank 200 when the fuel pressure of the fuel discharged from low-pressure fuel pump 180 becomes higher than a predetermined set fuel-pressure. Accordingly, it is prevented that the fuel pressure provided to intake manifold injector 120 and the fuel pressure provided to high-pressure fuel pump 150 are higher than the aforementioned set fuel pressure.

Each in-cylinder injector 110 is connected to a common fuel delivery pipe 130. This high-pressure fuel delivery pipe 130 is connected to a high-pressure fuel pump unit 150 configured to include an engine-driven high-pressure fuel pump.

Figure 14:
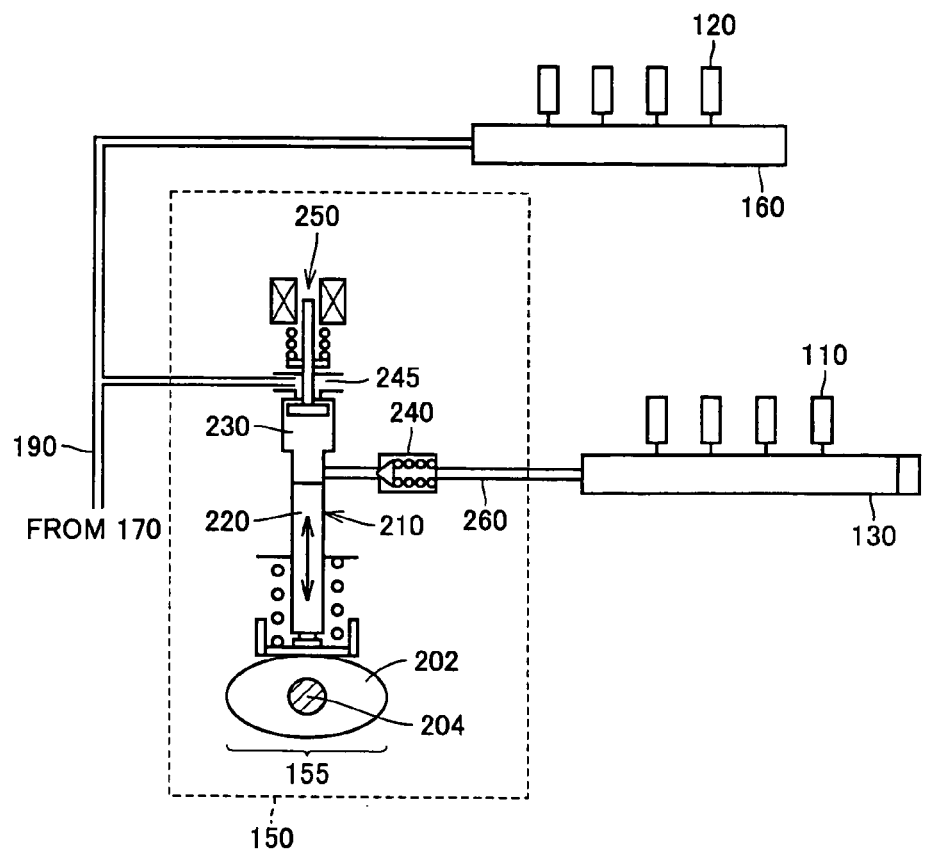
FIG. 14 shows an exemplary configuration of a high-pressure fuel pump unit shown in FIG. 2.

FIG. 14 shows an exemplary configuration of high-pressure fuel pump unit 150 shown in FIG. 2.

Referring to FIG. 14, high-pressure fuel pump unit 150 includes an engine-driven high-pressure fuel pump 155.

High-pressure fuel pump 155 is attached to a cylinder head (not shown) to drive a plunger 220 to allow it to reciprocate in a pump cylinder 210 through the rotary drive of a pump cam 202 provided at a cam shaft 204 for the intake valve (not shown) or exhaust valve (not shown) of engine 10. Further, high-pressure fuel pump 155 includes a high-pressure pump chamber 230 partitioned by a pump cylinder 210 and plunger 220, a gallery 245 coupled to low-pressure fuel channel 190, and an electromagnetic spill valve 250. Electromagnetic spill valve 250 is opened/closed to control the communication/cutoff between gallery 245 and high-pressure pump chamber 230.

The discharge side of high-pressure fuel pump 155 is coupled to fuel delivery pipe 130 that delivers fuel towards in-cylinder injector 110 via high-pressure fuel channel 260. High-pressure fuel channel 260 is provided with a check valve (non-return valve) 240 restricting backflow of the fuel from fuel delivery pipe 130 toward high-pressure fuel pump 155. The intake side of high-pressure fuel pump 155 is coupled to low-pressure fuel channel 190.

Figure 15:
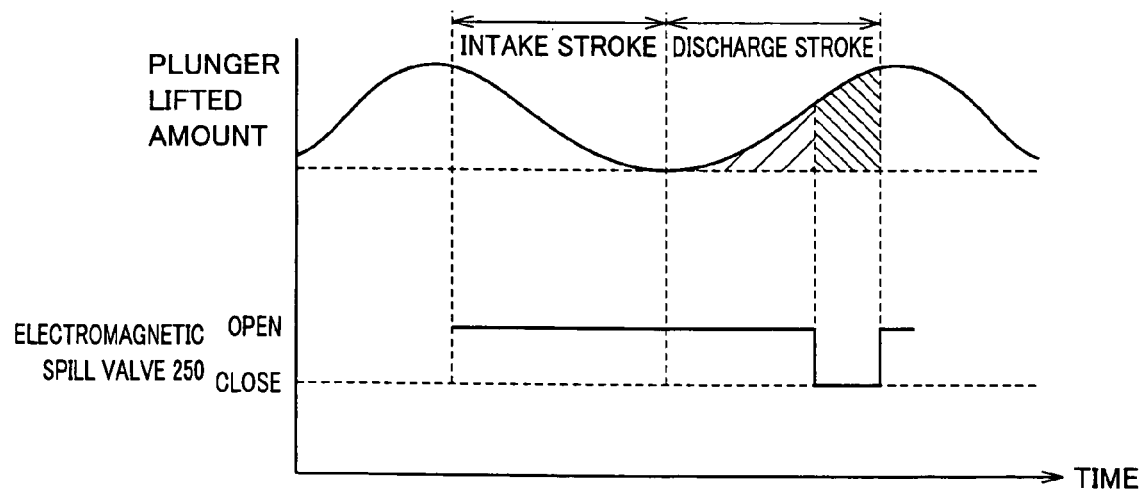
FIG. 15 schematically illustrates an operation of the high-pressure fuel pump unit shown in FIG. 14.

Referring to FIG. 15, in the intake stroke in which the amount of lift of plunger 220 decreases according to rotation of pump cam 202, the volumetric capacity of high-pressure pump chamber 230 is increased by the reciprocation of plunger 220. In the intake stroke, electromagnetic spill valve 250 is maintained in the open state.

Referring again to FIG. 14, during the valve-opening period of electromagnetic spill valve 250, gallery 245 is in communication with high-pressure pump chamber 230, so that the fuel is drawn from low-pressure fuel channel 190 via gallery 245 into high-pressure pump chamber 230 in the intake stroke.

Referring again to FIG. 15, in the exhaust stroke in which the amount of lift of plunger 220 increases according to rotations of pump cam 202, the volumetric capacity of high-pressure pump chamber 230 is decreased by the reciprocation of plunger 220. In the exhaust stroke, engine ECU 300 controls opening/closing of electromagnetic spill valve 250.

Referring again to FIG. 14, while electromagnetic spill valve 250 is opened in the exhaust stroke, gallery 245 and high-pressure pump chamber 230 communicate with each other, and thus the fuel drawn into high-pressure pump chamber 230 overflows toward low-pressure fuel channel 190 via gallery 245. In other words, the fuel is not delivered via high-pressure fuel channel 260 to fuel delivery pipe 130 but returned via gallery 245 toward low-pressure fuel channel 190.

In contrast, while electromagnetic spill valve 250 is closed, gallery 245 and high-pressure pump chamber 230 do not communicate with each other. Therefore, the fuel pressurized in the exhaust stroke does not flow back to gallery 245 but is delivered via high-pressure fuel channel 260 toward fuel delivery pipe 130.

Engine ECU 300 refers to the fuel pressure detected by a fuel-pressure sensor 400 as well as the quantity of injected fuel that is controlled by the ECU so as to control the open/close timing of electromagnetic spill valve 250. Thus, engine ECU 300 can adjust the quantity of fuel pressurized and delivered from high-pressure fuel pump unit 150 to high-pressure fuel delivery pipe 130 and adjust the pressure of fuel in high-pressure fuel delivery pipe 130 to a required pressure. The fuel-pressure boost system thus configured (high-pressure fuel pump unit 150) can be used to secure the pressure of fuel injected from each in-cylinder injector 110.

Regarding high-pressure fuel pump 155, the sound of impact caused by closing electromagnetic spill valve 250 as pressurized is mainly an operating sound that could be sensed by a driver. In other words, while plunger 220 is driven to reciprocate and electromagnetic spill valve 250 is opened all the time, the pressure-increasing operation is stopped and thus such an operating sound as described above does not occur.

While the operation of the above-described fuel-pressure boost system (high-pressure fuel pump unit 150) is stopped, electromagnetic spill valve 250 is kept open and fuel is injected from each in-cylinder injector 110 by the pressure of fuel discharged from low-pressure fuel pump 180. Specifically, low-pressure fuel pump 180 corresponds to "first fuel pump" of the present invention and high-pressure fuel pump 155 corresponds to "second fuel pump" of the present invention.

It is noted that, as high-pressure fuel pump unit 150, a high-pressure pump of all-discharge type, namely a high-pressure pump that does not have electromagnetic spill valve 250 and that increases the pressure of the whole quantity of intake fuel to discharge the resultant fuel may be employed (see for example the fuel supply apparatus disclosed in Japanese Patent Laying-Open No. 07-293381). Even if this type of high-pressure pump is used, an operating sound could be caused, in the pressure-increasing operation, by vibrations due to rattle for example of the rotational driving. This configuration may be the one in which this pressure-increasing pump is bypassed and a bypass valve is provided for coupling low-pressure fuel channel 190 and high-pressure fuel channel 260 to each other. In this configuration, while the operation of the fuel-pressure boost system (high-pressure pump) is stopped, the bypass valve may be opened to use the fuel discharged from low-pressure fuel pump 180 so as to inject the fuel from each in-cylinder injector 110.

Referring again to FIG. 2, engine ECU 300 is configured with a digital computer and includes a ROM (Read Only Memory) 320, a RAM (Random Access Memory) 330, a CPU (Central Processing Unit) 340, an input port 350, and an output port 360 that are connected to each other via a bidirectional bus 310.

Airflow meter 42 generates an output voltage that is proportional to an intake air quantity, and the output voltage of airflow meter 42 is input via an A/D converter 370 to input port 350. To engine 10, a coolant temperature sensor 380 is attached that generates an output voltage proportional to an engine coolant temperature. The output voltage of coolant temperature sensor 380 is input via an A/D converter 390 to input port 350.

To fuel delivery pipe 130, a fuel-pressure sensor 400 is attached that generates an output voltage proportional to a fuel pressure in fuel delivery pipe 130. The output voltage of fuel pressure sensor 400 is input via an A/D converter 410 to input port 350. To exhaust manifold 80 located upstream of three-way catalytic converter 90, an air-fuel ratio sensor 420 is attached that generates an output voltage proportional to an oxygen concentration in exhaust gas, and the output voltage of air-fuel ratio sensor 420 is input via an A/D converter 430 to input port 350.

Air-fuel ratio sensor 420 in the engine system of the present embodiment is a full-range air-fuel ratio sensor (linear air-fuel ratio sensor) that generates an output voltage proportional to an air-fuel ratio of an air-fuel mixture burned in engine 10. As air-fuel ratio sensor 420, an $O_2$ sensor may be used which detects, in an on/off manner, whether the air-fuel ratio of the mixture burned in engine 10 is rich or lean with respect to the stoichiometric air-fuel ratio.

Accelerator pedal 100 is connected to an accelerator press-down degree sensor 440 that generates an output voltage proportional to the degree of press-down of accelerator pedal 100. The output voltage of accelerator press-down degree sensor 440 is input via an A/D converter 450 to input port 350. An engine speed sensor 460 generating an output pulse representing the engine speed is connected to input port 350. ROM 320 of engine ECU 300 stores in advance, in the form of a map, values of fuel injection quantity that are set in association with driving states based on the engine load factor and the engine speed obtained by the above-described accelerator press-down degree sensor 440 and engine speed sensor 460, respectively, and the correction values based on the engine coolant temperature.

Engine ECU 300 generates various control signals for controlling the overall operation of the engine system based on signals from the respective sensors by executing a prescribed program. The control signals are transmitted to the devices and circuits constituting the engine system via output port 360 and drive circuits 470.

In engine 10 of the embodiment of the present invention, each cylinder 112 is provided with both of in-cylinder injector 110 and intake manifold injector 120. Therefore, for the required total fuel injection quantity that is calculated in the above-described manner, it is necessary to control the fuel injection ratio between in-cylinder injector 110 and intake manifold injector 120.

In the following, the fuel injection ratio between these injectors is represented by "DI ratio r" that is the ratio of a fuel injection quantity of in-cylinder injector 110 to the total fuel injection quantity. Specifically, "DI RATIO r=100%" means that fuel is injected from in-cylinder injector 110 only, and "DI RATIO r=0%" means that fuel is injected from intake manifold injector 120 only. "DI RATIO r≠0%", "DI RATIO r≠100%" and "0%<DI RATIO r<100%" mean that the fuel injection is carried out by both of in-cylinder injector 110 and intake manifold injector 120. It is noted that, regarding in-cylinder injector 110, improvement in antiknock performance by the effect of latent heat of vaporization can contribute to enhancement of output performance. Regarding intake manifold injector 120, suppression of rotational (torque) variations by the effect of improved homogeneousness of the air-fuel mixture can contribute to enhancement of output performance.

Engine ECU 300 that is the internal-combustion-engine control apparatus according to the embodiment of the present invention performs fuel injection control as described below for an operation state in which the sound generated from the whole vehicle is low in volume.

Figure 3:
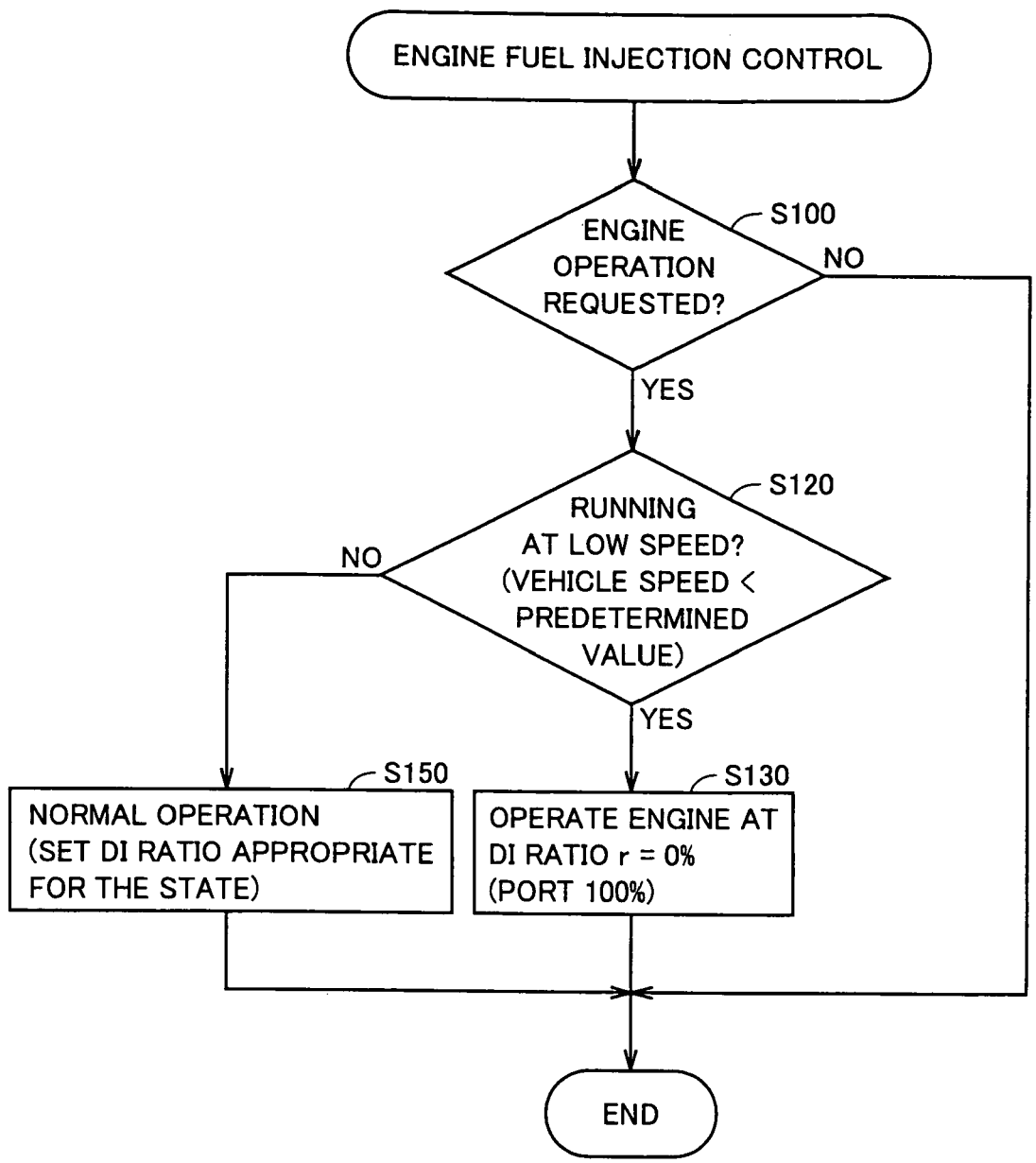
FIG. 3 is a flowchart illustrating a first example of fuel injection control according to a first embodiment of the present invention.

FIG. 3 is a flowchart illustrating a first example of the fuel injection control by engine ECU 300, according to the first embodiment of the present invention.

Referring to FIG. 3, engine ECU 300 determines in step S120, when a request to operate the engine is made by hybrid ECU 590 (determination YES in step S100), whether or not vehicle 500 is running at a low speed.

The determination in step S120 is made based on whether or not the vehicle speed of hybrid vehicle 500 is lower than a predetermined value. The predetermined value is set as a value associated with an operation state in which the sound generated from the whole vehicle is low in volume, for example, an idle operation state in which there is no accelerator manipulation by the driver and the vehicle is driven to run by only the output of electric motor 530.

In the case where the vehicle is not running at a low speed (determination NO in step S120), engine ECU 300 sets the DI ratio for a normal operation according to conditions in step S150. In step S150, according to a preset map for example, DI ratio r is set in the range of 0 to 100% according to the engine conditions at that time (engine temperature, engine speed, engine load factor for example).

In contrast, for operating the engine while the vehicle is running at a low speed (determination YES in step S120), engine ECU 300 in step S130 sets DI ratio r to 0% (r=0%) to operate the engine. Namely, without using fuel injection into the cylinder by in-cylinder injector 110, only the port injection by intake manifold injector 120 is used to operate engine 10.

Accordingly, while the vehicle is in the low-speed running state in which the sound generated from the whole vehicle is low in volume, engine 10 can be operated without operating the fuel-pressure boost system (high-pressure fuel pump unit 150) shown in FIG. 2. Thus, the operating sound of engine 10 can be suppressed to prevent the driver from feeling the sound uncomfortable or unusual.

Figure 4:
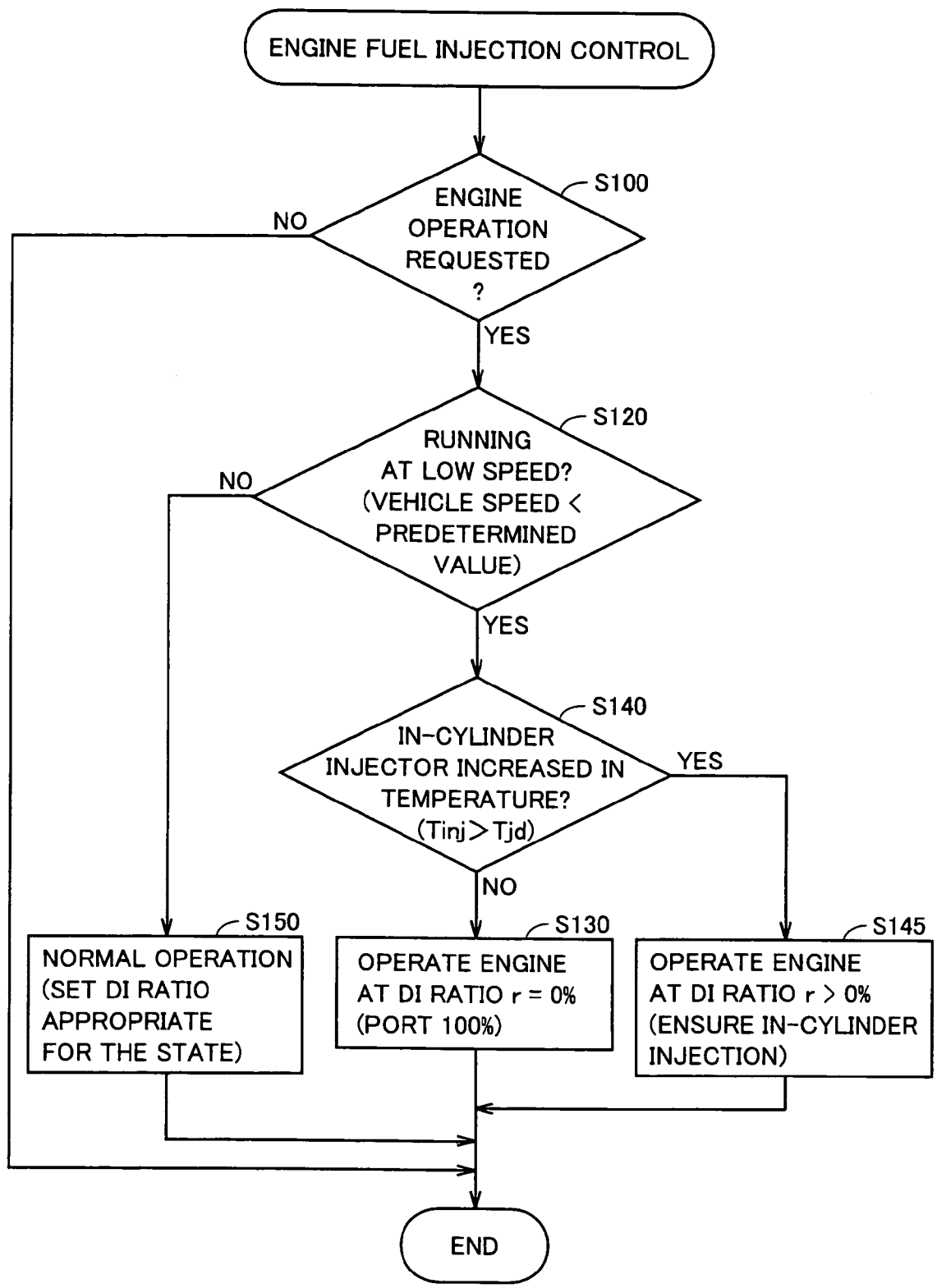
FIG. 4 is a flowchart illustrating a second example of fuel injection control according to the first embodiment of the present invention.

FIG. 4 is a flowchart illustrating a second example of the fuel injection control according to the first embodiment of the present invention.

The flowchart shown in FIG. 4 includes steps S140 and S145 in addition to the steps of the flowchart shown in FIG. 3.

Steps S140 and S145 are carried out in the low-speed running state (determination YES in step S120). Engine ECU 300 determines in step S140 whether or not the temperature of in-cylinder injector 110 increases. For example, injector temperature Tinj of the in-cylinder injector and determination temperature Tjd that is the temperature for making determination are compared with each other to make the determination in step S140. Determination temperature Tjd is set in consideration of a risk of deposit build-up as the temperature of in-cylinder injector 110 increases.

The temperature of in-cylinder injector 110 changes according to heat transfer from the whole engine to which the injector is coupled and according to heat transfer from the temperature of the inside of the cylinder (inside of the combustion chamber). Here, the heat transfer from the whole engine can be estimated from the engine coolant temperature and the outside temperature. The temperature of the inside of the cylinder can be estimated from the state of combustion in the combustion chamber, namely operating conditions (speed and load factor) of the engine as well as the air-fuel ratio (A/F).

Thus, engine ECU 300 can calculate an estimated value of the injector temperature at that time, according to a predetermined function having as variables the engine coolant temperature and the outside temperature detected by sensors as well as the engine speed, the engine load factor and the set air-fuel ratio for example. Selection and adjustment of such variables or constants of the predetermined function can generally be made based on experimental results. Alternatively, if possible in terms of the configuration, a temperature sensor may directly be provided to in-cylinder injector 110. Thus, the estimated or measured injector temperature Tinj is used to make the determination in step S140.

In the case where injector temperature Tinj is lower than the determination temperature (determination NO in step S140), engine ECU 300 performs step S130 similar to that in FIG. 3, since there is a low risk of deposit build-up which is caused by an excessively high temperature of in-cylinder injector 110. In this way, the fuel injection control similar to that of the flowchart in FIG. 3 is performed to operate engine 10, while the vehicle is running at a low speed, by the fuel injection from intake manifold injector 120 (DI ratio r=0%) for the purpose of suppressing the operating sound of engine 10.

In contrast, in the case where injector temperature Tinj is higher than determination temperature Tjd (determination YES in step S140), engine ECU 300 performs step S145 instead of step S130 to set the DI ratio as "DI ratio r>0%" so that at least a part of the total fuel injection quantity is injected from in-cylinder injector 110. Accordingly, for in-cylinder injector 110, a temperature increase is suppressed by latent heat of vaporization of the injected fuel. Thus, clogging due to deposit build-up can be prevented from occurring.

Engine ECU 300 performs at predetermined intervals the fuel injection control following the flowchart shown in FIG. 4. Therefore, in the case where the injector temperature is decreased by performing step S145 (determination NO in step S140), step S130 is performed again to operate engine 10 by port injection (DI ratio r=0%).

Thus, the fuel injection control following the flowchart in FIG. 4 can be used to monitor a temperature increase of in-cylinder injector 110 that could lead to injector clogging while operating engine 10 by port injection to suppress the operating sound.

It is noted that, in consideration of the fact that the main purpose of the engine operation in the vehicle's low-speed running state is not to obtain engine output as requisite in response to manipulation of the accelerator by the driver, the fuel injection from in-cylinder injector 110 according to the setting in step S145 may be performed while stopping the fuel-pressure boost system (high-pressure fuel pump unit 150) shown in FIGS. 2 and 3 in order to suppress the operating sound. In this case, the fuel injection from each in-cylinder injector 110 is carried out using the pressure of fuel discharged from low-pressure fuel pump 180 (feed pressure). However, engine output as the force for driving the vehicle is not required here and thus there is no deterioration in operating performance. Further, even when the fuel injection is performed at the aforementioned feed pressure, the effect of cooling the injector by latent heat of vaporization of the fuel can still be obtained.

Figure 5:
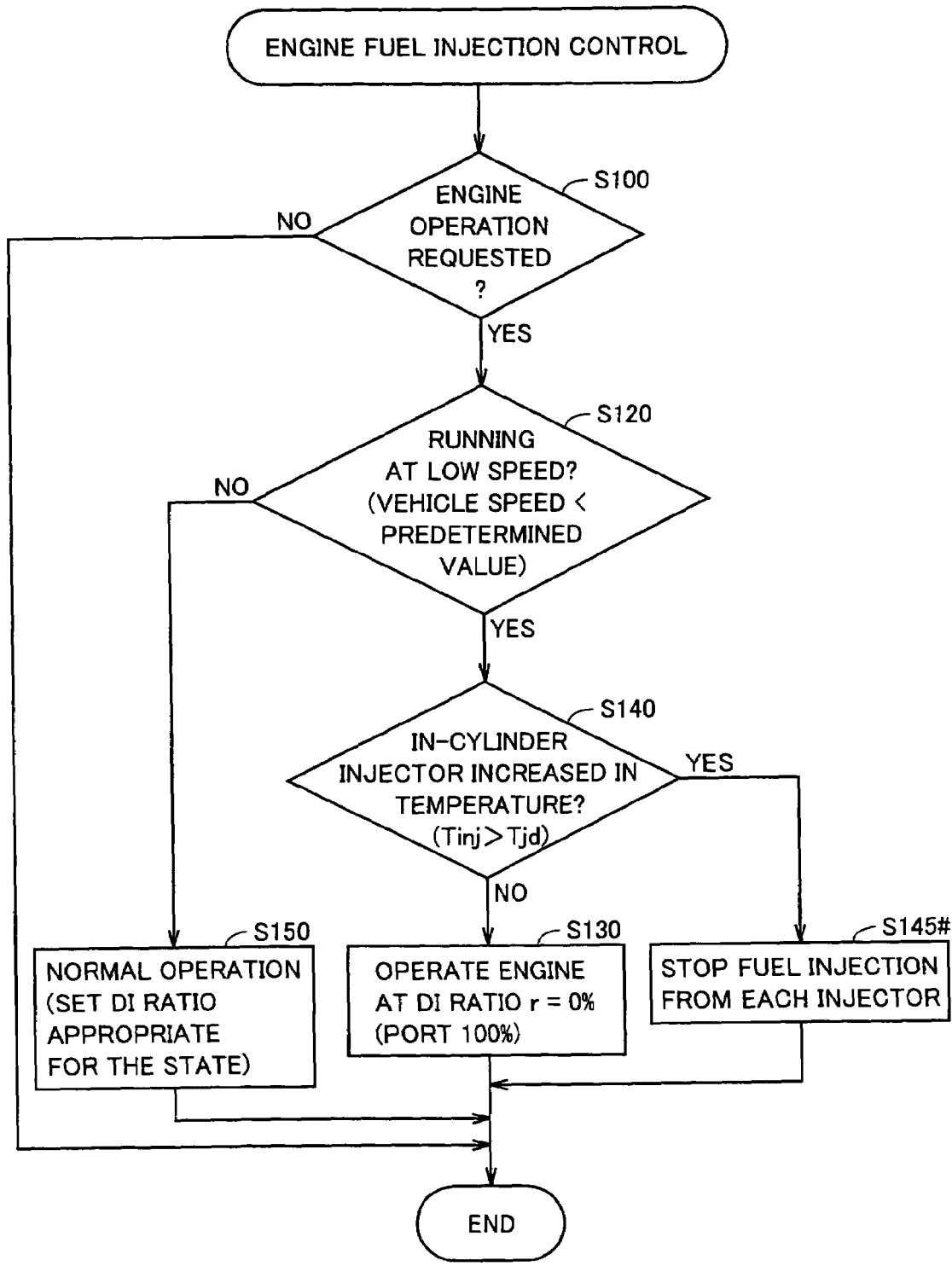
FIG. 5 is a flowchart illustrating a third example of fuel injection control according to the first embodiment of the present invention.

FIG. 5 is a flowchart illustrating a third example of the fuel injection control according to the first embodiment of the present invention.

The flowchart shown in FIG. 5 differs from the flowchart shown in FIG. 4 in that the former includes step S145# instead of step S145 that is performed when the determination in step S140 is YES.

Engine ECU 300 in step S145# stops fuel injection from injectors 110, 120 to stop combustion of engine 10 and thereby prevent a temperature increase of in-cylinder injector 110.

It is noted that, since the main purpose of the engine operation in the vehicle's low-speed running state is not to obtain engine output as requisite in response to accelerator manipulation by the driver as described above, the operating performance is not deteriorated even when the combustion of engine 10 is stopped.

Engine ECU 300 performs at predetermined intervals the fuel injection control following the flowchart shown in FIG. 4. Therefore, in the case where the injector temperature is decreased by performing step S145# (determination NO in step S140), step S130 is performed again to operate engine 10 by port injection (DI ratio r=0%).

The fuel injection control following the flowchart in FIG. 5 can also be used to monitor a temperature increase of in-cylinder injector 110 that could lead to injector clogging while operating engine 10 by the port injection so that the operating sound can be suppressed.

Here, regarding how the flowcharts in FIGS. 3 to 5 and the elements of the present invention correspond to each other, step S100 corresponds to "vehicle speed determination means" of the present invention, step S130 corresponds to "first fuel injection control means" of the present invention and step S145 corresponds to "second fuel injection control means" of the present invention. Further, step S140 corresponds to "temperature determination means" of the present invention and step S145# corresponds to "combustion stop means" of the present invention.

Second Embodiment

As described above, the request to operate the engine that is made by hybrid ECU 590 shown in FIG. 1 is also issued except for the case where a request for engine output to be used as the vehicle's driving force is made.

Figure 6:
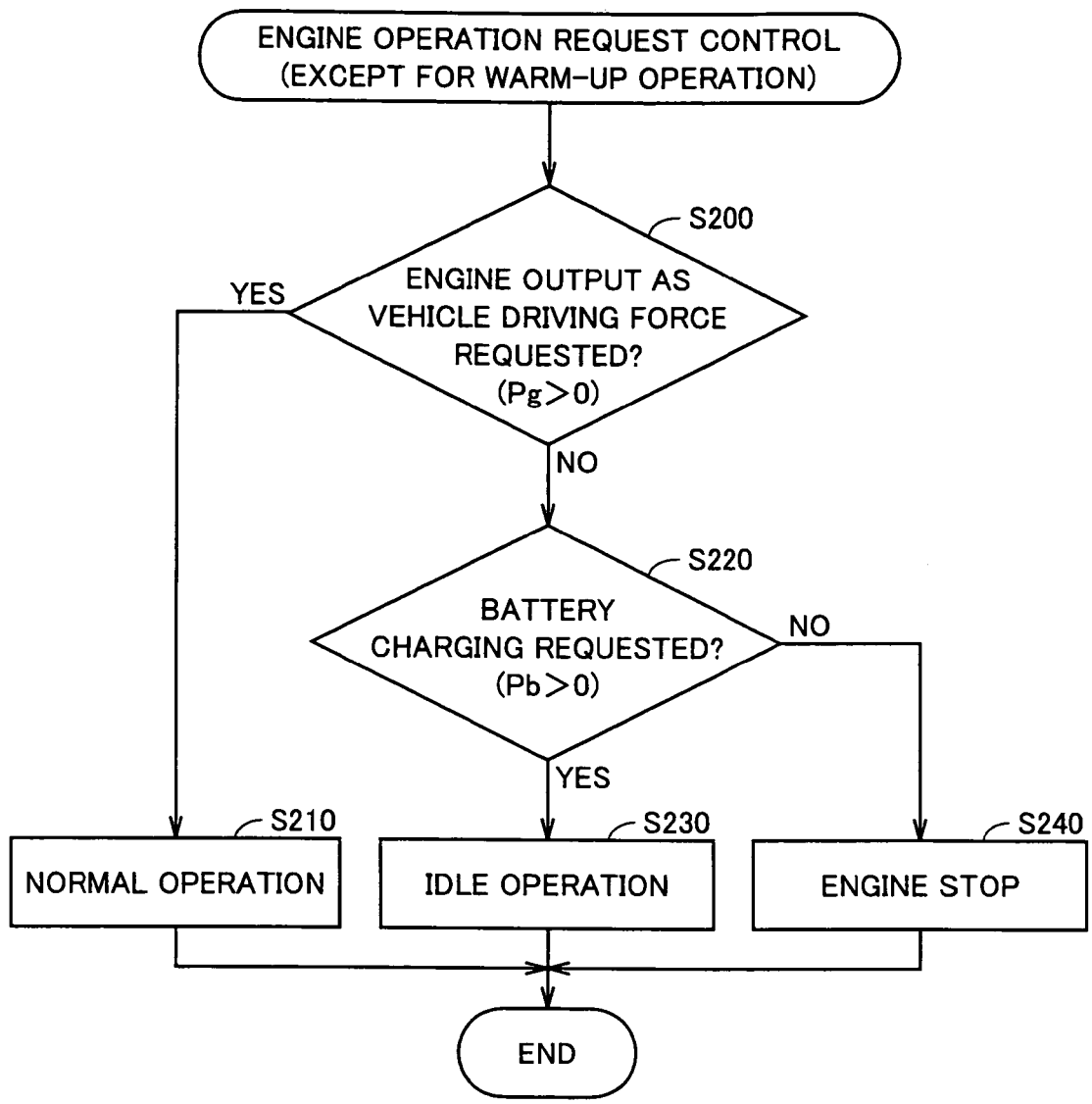
FIG. 6 is a flowchart illustrating control of a request to operate the engine of the hybrid vehicle.

FIG. 6 is a flowchart illustrating engine operation request control by hybrid ECU 590. FIG. 6 shows a flow of generation of the request for engine operation except for warm-up operation.

Referring to FIG. 6, hybrid ECU 590 calculates engine output request Pg corresponding to the vehicle driving force generated according to manipulation/operation of the accelerator by the driver and calculates engine output request Pb for charging the battery. When the sum (Pg+Pb) is larger than zero, namely (Pg+Pb)>0, hybrid ECU 590 generates the engine operation request. It is noted that this engine output request Pg is set according to the control of the output ratio between engine 10 and electric motor 530 according to the operating state as described above.

Hybrid ECU 590 in step S200 determines whether or not engine output request Pg to be used as the vehicle driving force is larger than zero, namely Pg>0. In the case where the relation Pg >0 is satisfied (determination YES in step S200), hybrid ECU 590 in step S210 instructs to perform normal operation of engine 10. The determination in step S200 is made by comparing engine output request Pg with a predetermined determination value close to zero.

In the case where there is no request for engine output to be used as the vehicle driving force, namely Pg=0 (determination NO in step S200), hybrid ECU 590 in step S220 determines whether or not a request to charge the battery is made (step S220).

Hybrid ECU 590 in step S220 determines whether or not engine output request Pb for charging the battery is larger than zero, namely Pb>0. The determination in step S220 is made by comparing engine output request Pb with a predetermined determination value close to zero.

In the case where there is no request for engine output to be used as the vehicle driving force and there is no request for battery charging, namely Pg=0 and Pb=0 (determination NO in step S220), hybrid ECU 590 instructs engine 10 to stop (step S240).

In contrast, in the case where the request for engine output to be used as the vehicle driving force is zero, namely Pg=0 while the battery charging request is made (determination YES in step S220), hybrid ECU 590 instructs engine 10 to perform idle operation (step S230).

Engine 10 is also operated in the idle mode in the warm-up operation (not shown). In this case, in-cylinder injector 110 is controlled so that stratified charge combustion is carried out. The stratified charge combustion in such a warm-up operation can promote catalyst warm-up and thereby improve exhaust emissions.

In the second embodiment, the engine operation request control shown in FIG. 6 is incorporated to perform the fuel injection control.

Figure 7:
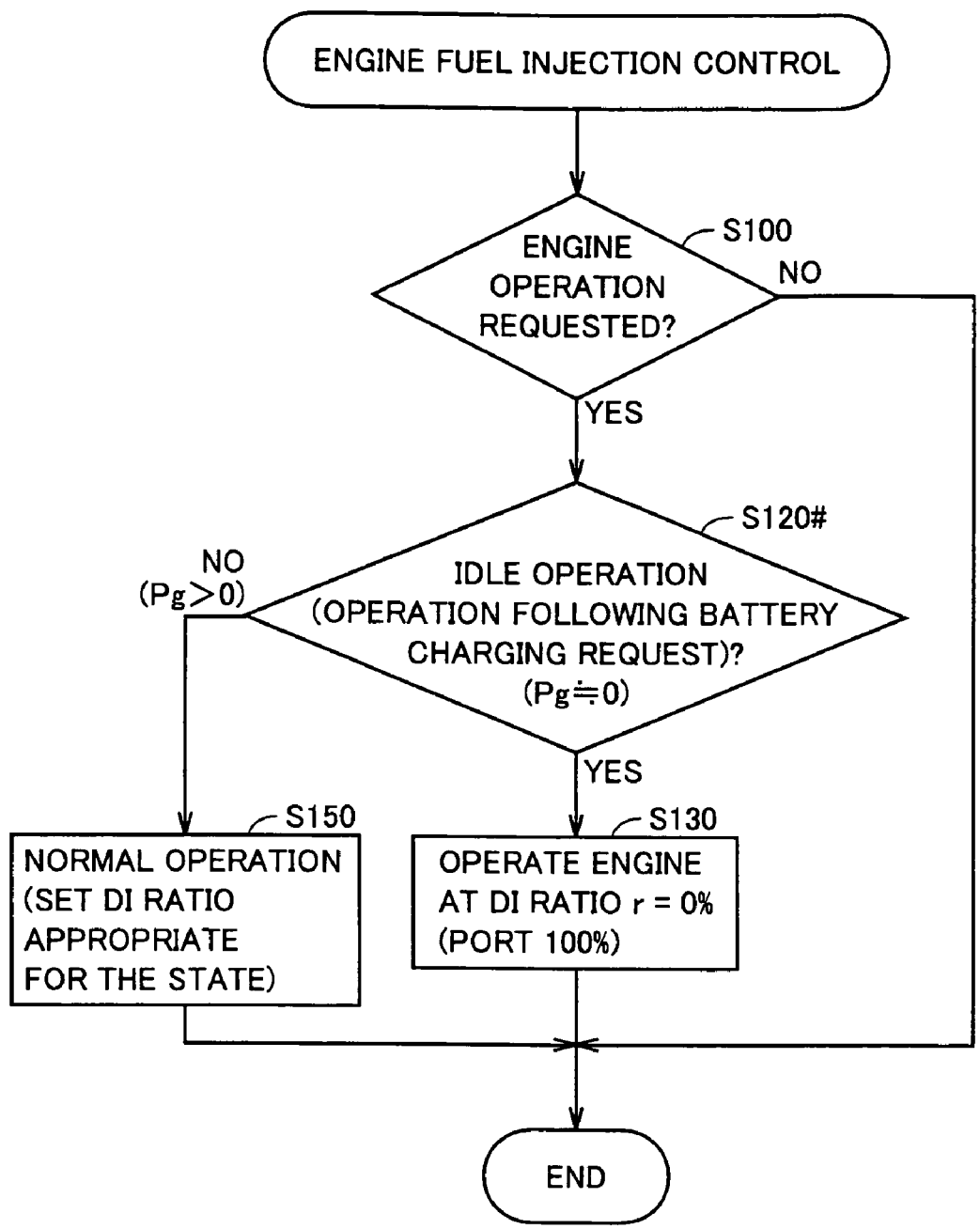
FIG. 7 is a flowchart illustrating a first example of fuel injection control according to a second embodiment of the present invention.

FIG. 7 shows a flowchart illustrating a first example of the fuel injection control according to the second embodiment of the present invention.

The flowchart shown in FIG. 7 differs from the flowchart shown in FIG. 3 in that the former includes step S120# performed instead of step S120. Other elements for control are similar to those in FIG. 3 and the detailed description thereof is not repeated.

Engine ECU 300 in step S120# determines whether engine output request Pg to be used as the vehicle driving force in response to the request to operate the engine is approximately equal to zero, namely P≈0. The determination in step S120# is made by comparing engine output request Pg with a predetermined determination value close to zero. Namely, step S120# corresponds to "operation request determination means" of the present invention.

Thus, typically, when hybrid ECU 590 gives an instruction to perform the idle operation (step S230 in FIG. 6) in response to the battery charging request, the determination in step S120# is YES. In other words, the determination in step S120#, similar to step S120, is YES to address the operation state in which the sound generated from the whole vehicle low in volume.

The subsequent process steps according to the result of the determination in step S120# are similar to those of the flowchart in FIG. 3. Thus, in the idle operation which is performed according to the request to charge the battery and in which the generated sound of the whole vehicle is low in volume, the fuel-pressure boost system (high-pressure fuel pump unit 150) shown in FIGS. 2 and 3 is not operated and engine 10 is operated by port injection. Accordingly, the operating sound of engine 10 can be suppressed to prevent the driver from feeling the sound uncomfortable or unusual.

Figure 8:
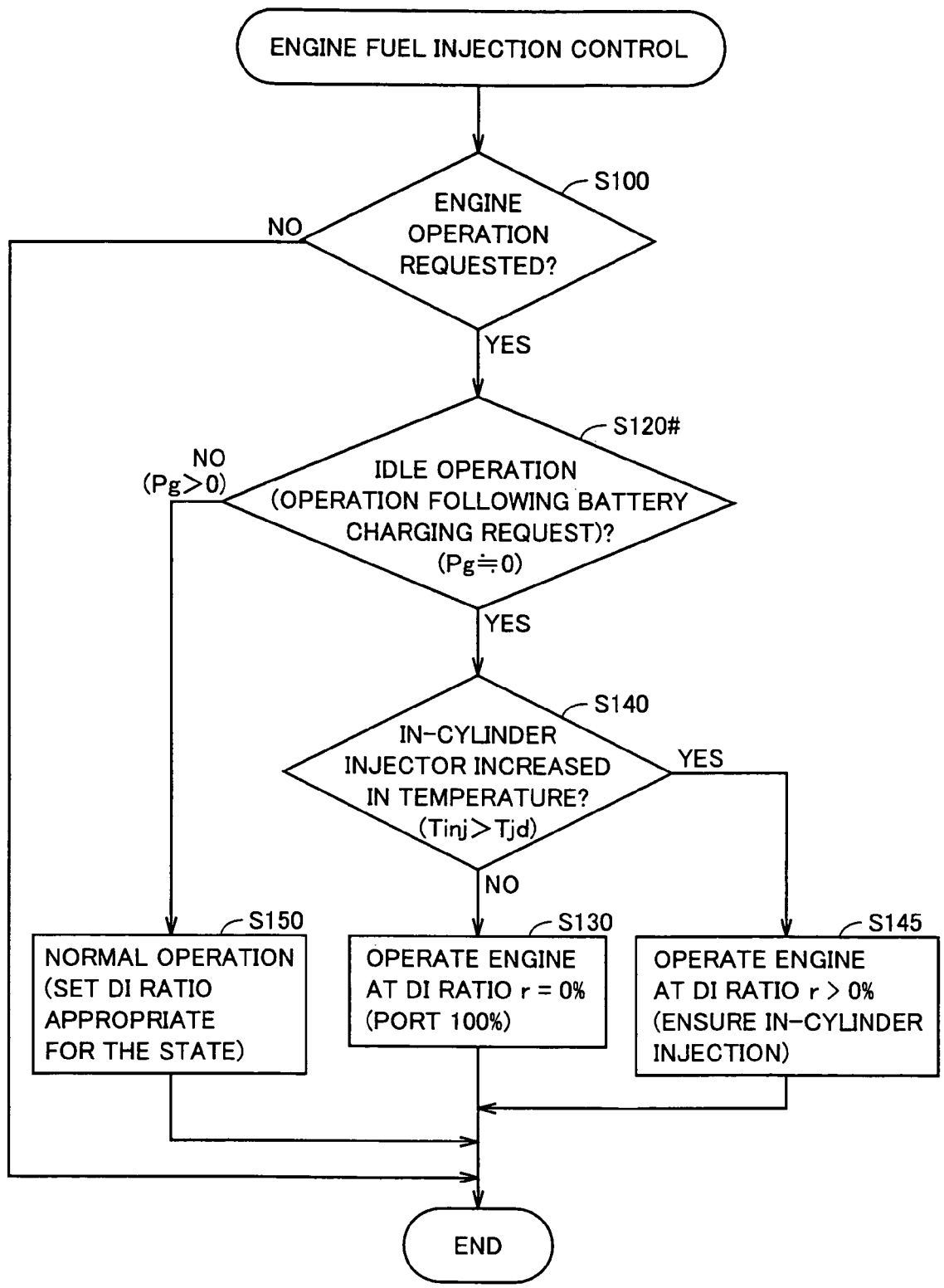
FIG. 8 is a flowchart illustrating a second example of fuel injection control according to the second embodiment of the present invention.
Figure 9:
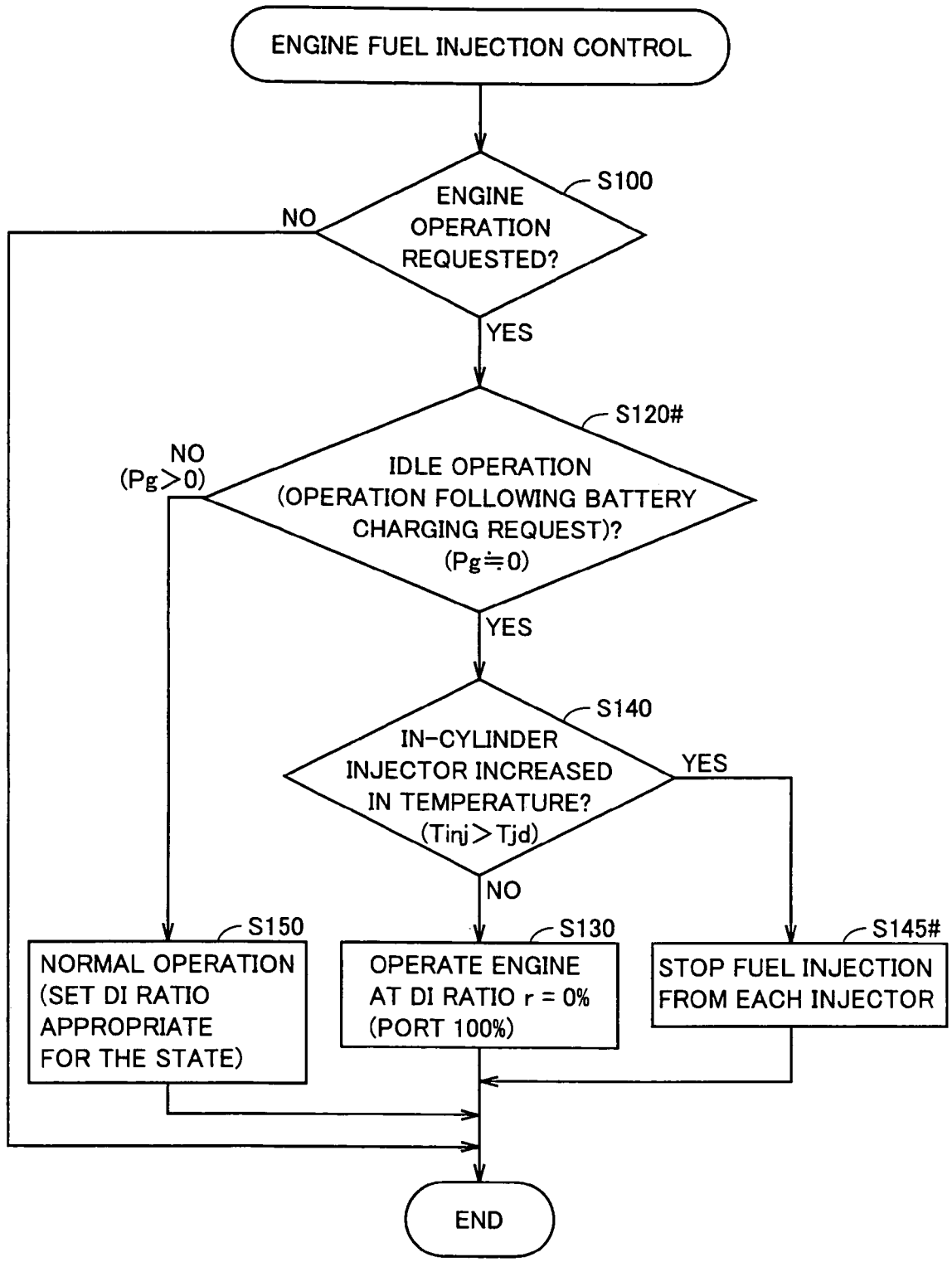
FIG. 9 is a flowchart illustrating a third example of fuel injection control according to the second embodiment of the present invention.

FIGS. 8 and 9 show respective flowcharts illustrating second and third examples of the fuel injection control according to the second embodiment, which correspond respectively to the examples of the fuel injection control shown in FIGS. 4 and 5.

The fuel injection control shown in FIGS. 8 and 9 differs from the one in FIGS. 4 and 5 in that the former includes step S120# similar to that in FIG. 7 instead of step S120 of the flowcharts shown in FIGS. 4 and 5. Other elements of the fuel injection control shown in FIGS. 8 and 9 are similar to those of the flowcharts shown in FIGS. 4 and 5. Therefore, the description thereof is not repeated.

Accordingly, based on engine output request Pg that is the request for engine output to be used as the vehicle's driving force, the idle operation of engine 10 (typically idle operation while battery is charged) is detected so as to detect that the vehicle is in the operation state in which the generated sound of the whole vehicle is low in volume. In the operation state in which the sound generated from the whole vehicle is low in volume, monitoring is performed for avoiding occurrence of clogging due to a temperature increase of in-cylinder injector 110, while engine 10 is operated mainly by port injection.

Thus, the fuel injection control of the second embodiment can also be used to suppress the operating sound by operating engine 10 by port injection and taking measures for preventing clogging from occurring due to a temperature increase of in-cylinder injector 110, like the fuel injection control according to the first embodiment.

Hereinafter, preferable setting of the DI ratio in a normal operation mode (step S150) of the engine shown in FIG. 2 is described.

Figure 10:
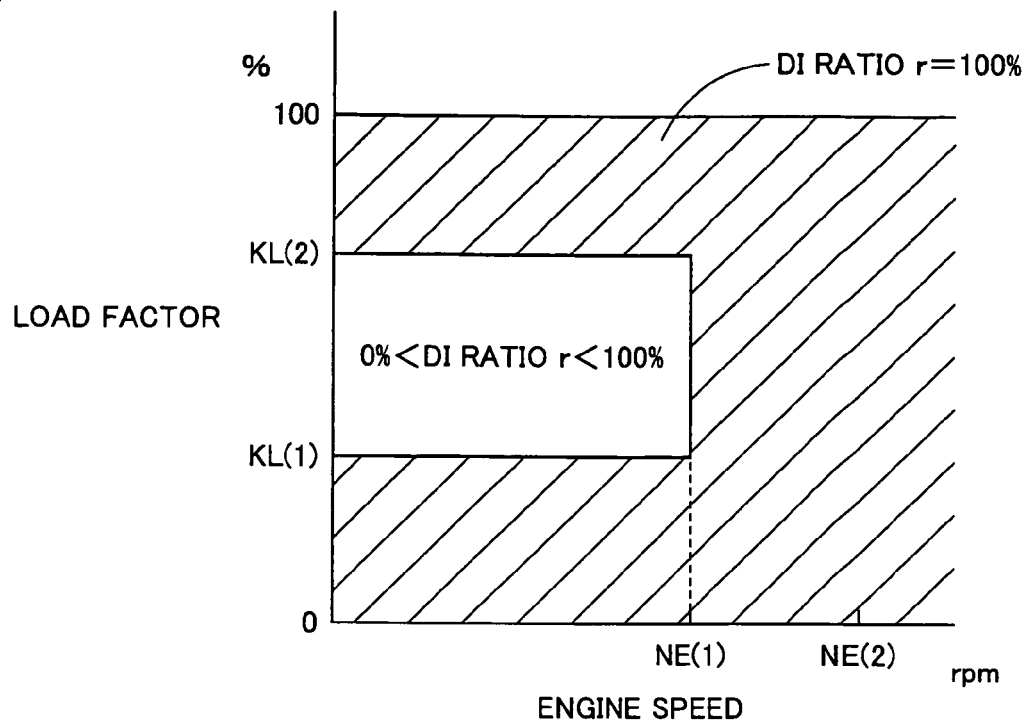
FIGS. 10 and 11 illustrate a first example of DI ratio setting maps (in the engine warm state and the engine cold state, respectively) in the engine system shown in FIG. 2.
Figure 11:
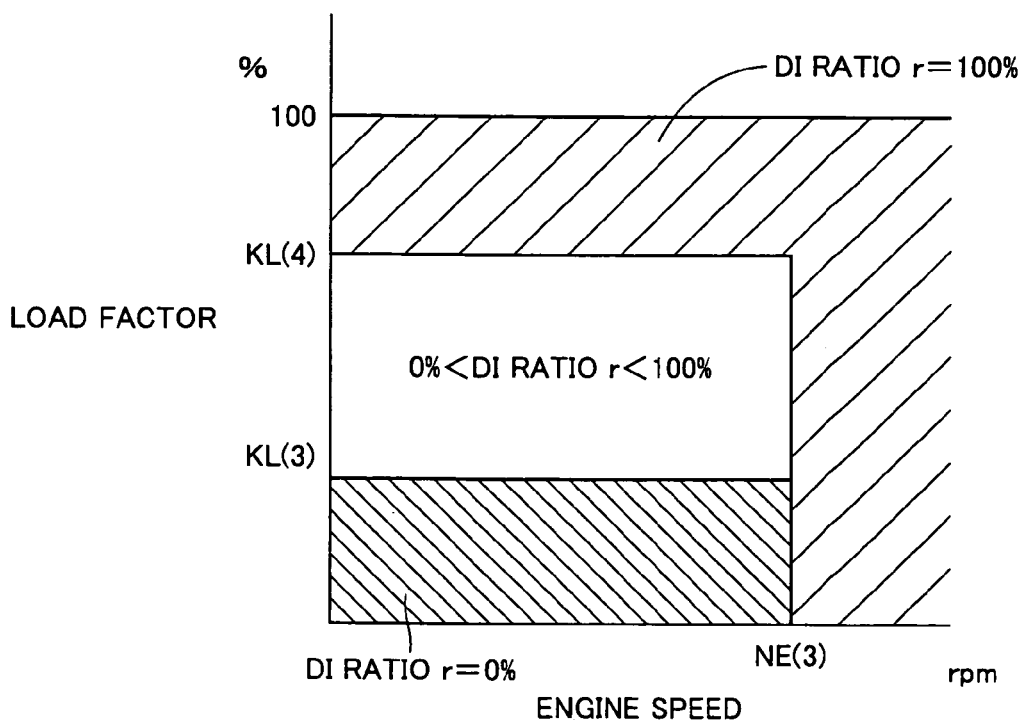

FIGS. 10 and 11 illustrate a first example of DI ratio setting maps in the engine system shown in FIG. 2.

The maps shown in FIGS. 10 and 11 are stored in ROM 320 of engine ECU 300. FIG. 10 is the map for a warm state of engine 10, and FIG. 11 is the map for a cold state of engine 10.

In the maps illustrated in FIGS. 10 and 11, with the horizontal axis representing an engine speed of engine 10 and the vertical axis representing a load factor, the fuel injection ratio of in-cylinder injector 110, or DI ratio r, is expressed in percentage.

As shown in FIGS. 10 and 11, DI ratio r is defined for each operation region that is determined by the engine speed and the load factor of engine 10, individually in the map for the warm state and the map for the cold state. The maps are configured to indicate different control regions of in-cylinder injector 110 and intake manifold injector 120 as the temperature of engine 10 changes. When the temperature of engine 10 detected is equal to or higher than a predetermined temperature threshold value, the map for the warm state shown in FIG. 10 is selected; otherwise, the map for the cold state shown in FIG. 11 is selected. In-cylinder injector 110 and/or intake manifold injector 120 are controlled based on the selected map and according to the engine speed and the load factor of engine 10.

The engine speed and the load factor of engine 10 set in FIGS. 10 and 11 are now described. In FIG. 10, NE(1) is set to 2500 rpm to 2700 rpm, KL(1) is set to 30% to 50%, and KL(2) is set to 60% to 90%. In FIG. 11, NE(3) is set to 2900 rpm to 3100 rpm. That is, NE(1)<NE(3). NE(2) in FIG. 10 as well as KL(3) and KL(4) in FIG. 11 are also set as appropriate.

From a comparison between FIG. 10 and FIG. 11, it is seen that NE(3) of the map for the cold state shown in FIG. 11 is greater than NE(1) of the map for the warm state shown in FIG. 10. This shows that, as the temperature of engine 10 is lower, the control region of intake manifold injector 120 is expanded to include the region of higher engine speed. That is, in the case where engine 10 is cold, deposits are unlikely to build up in the injection hole of in-cylinder injector 110 (even if the fuel is not injected from in-cylinder injector 110). Thus, the region where the fuel injection is to be carried out using intake manifold injector 120 can be expanded, to thereby improve homogeneity.

From the comparison between FIG. 10 and FIG. 11, it is further seen that "DI RATIO r=100%" holds in the region where the engine speed of engine 10 is NE(1) or higher in the map for the warm state, and in the region where the engine speed is NE(3) or higher in the map for the cold state. In terms of load factor, "DI RATIO r=100%" holds in the region where the load factor is KL(2) or greater in the map for the warm state, and in the region where the load factor is KL(4) or greater in the map for the cold state. This means that in-cylinder injector 110 alone is used in the region of a predetermined high engine speed, as well as in the region of a predetermined high engine load. That is, in the high speed region or the high load region, even if fuel injection is carried out using only in-cylinder injector 110, the engine speed and the load of engine 10 are high, ensuring a sufficient intake air quantity, so that it is readily possible to obtain a homogeneous air-fuel mixture using in-cylinder injector 110 alone. In this manner, the fuel injected from in-cylinder injector 110 is atomized within the combustion chamber involving latent heat of vaporization (or, absorbing heat from the combustion chamber). Thus, the temperature of the air-fuel mixture is decreased at the compression end, whereby antiknock performance is improved. Further, since the temperature within the combustion chamber is decreased, intake efficiency improves, leading to high power output.

According to the map for the warm state in FIG. 10, only in-cylinder injector 110 is used when the load factor is KL(1) or less. This shows that in-cylinder injector 110 alone is used in a predetermined low load region when the temperature of engine 10 is high. When engine 10 is in the warm state, deposits are likely to accumulate in the injection hole of in-cylinder injector 110. However, when fuel injection is carried out using in-cylinder injector 110, the temperature of the injection hole can be lowered, whereby accumulation of deposits is prevented. Further, clogging of in-cylinder injector 110 may be prevented while ensuring the minimum fuel injection quantity thereof. Thus, in-cylinder injector 110 alone is used in the relevant region.

As seen from the comparison between FIG. 10 and FIG. 11, there is a region of "DI RATIO r=0%" only in the map for the cold state in FIG. 11. This shows that fuel injection is carried out using only intake manifold injector 120 in a predetermined low load region (KL(3) or less) when the temperature of engine 10 is low. When engine 10 is cold and low in load and the intake air quantity is small, atomization of the fuel is unlikely to occur. In such a region, it is difficult to ensure favorable combustion with the fuel injection from in-cylinder injector 110. Further, particularly in the low-load and low-speed region, high power output using in-cylinder injector 110 is unnecessary. Accordingly, fuel injection is carried out using intake manifold injector 120 alone, rather than using in-cylinder injector 110, in the relevant region.

Further, in an operation other than the normal operation, i.e., in the catalyst warm-up state at idle of engine 10 (abnormal operation state), in-cylinder injector 110 is controlled to carry out stratified charge combustion. By causing the stratified charge combustion during the catalyst warm-up operation, warming up of the catalyst is promoted, and exhaust emission is thus improved.

Figure 12:
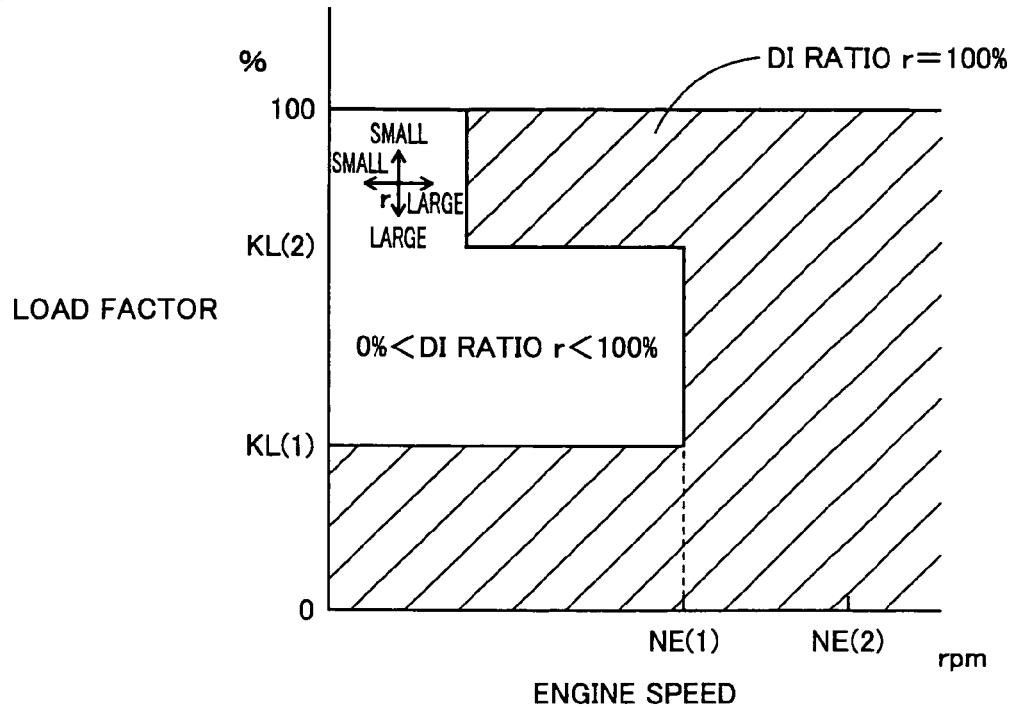
FIGS. 12 and 13 illustrate a second example of the DI ratio setting maps (in the engine warm state and the engine cold state, respectively) in the engine system shown in FIG. 2.
Figure 13:
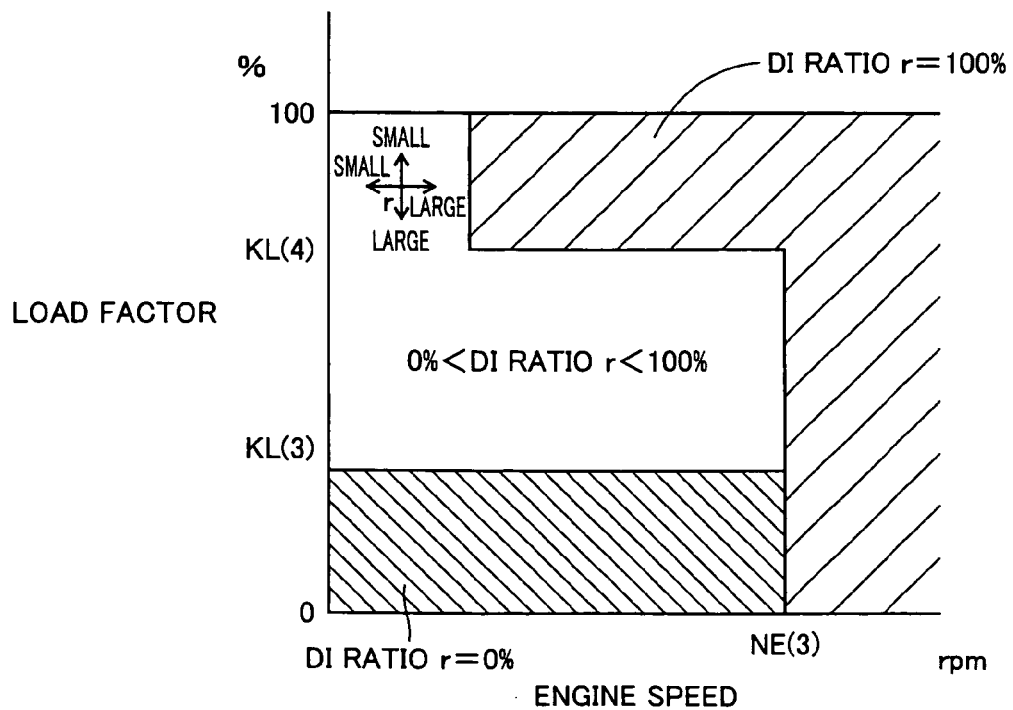

FIGS. 12 and 13 show a second example of the DI ratio setting maps in the engine system shown in FIG. 2.

The setting maps shown in FIG. 12 (warm state) and FIG. 13 (cold state) differ from those of FIGS. 10 and 11 in the DI ratio settings in the low-speed and high-load region.

In engine 10, in the low-speed and high-load region, mixing of an air-fuel mixture formed by the fuel injected from in-cylinder injector 110 is poor, and such inhomogeneous air-fuel mixture within the combustion chamber may lead to unstable combustion. Thus, the fuel injection ratio of the in-cylinder injector is increased as the engine speed approaches the high-speed region where such a problem is unlikely to occur, whereas the fuel injection ratio of in-cylinder injector 110 is decreased as the engine load approaches the high-load region where such a problem is likely to occur. These changes in DI ratio r are shown by crisscross arrows in FIGS. 12 and 13.

In this manner, variation in output torque of the engine attributable to the unstable combustion can be suppressed. It is noted that these measures are approximately equivalent to the measures to decrease the fuel injection ratio of in-cylinder injector 110 as the state of the engine moves toward the predetermined low speed region, or to increase the fuel injection ratio of in-cylinder injector 110 as the engine state moves toward the predetermined low load region. Further, except for the relevant region (indicated by the crisscross arrows in FIGS. 12 and 13), in the region where fuel injection is carried out using only in-cylinder injector 110 (on the high speed side and on the low load side), a homogeneous air-fuel mixture is readily obtained even when the fuel injection is carried out using only in-cylinder injector 110. In this case, the fuel injected from in-cylinder injector 110 is atomized within the combustion chamber involving latent heat of vaporization (by absorbing heat from the combustion chamber). Accordingly, the temperature of the air-fuel mixture is decreased at the compression end, and thus, the antiknock performance is improved. Further, with the temperature of the combustion chamber decreased, intake efficiency is improved, leading to high power output.

DI ratio settings in the other regions in the setting maps of FIGS. 12 and 13 are similar to those of FIG. 10 (warm state) and FIG. 11 (cold state), and thus, the detailed description thereof is not repeated.

In this engine 10 explained in conjunction with FIGS. 10-13, homogeneous combustion is achieved by setting the fuel injection timing of in-cylinder injector 110 in the intake stroke, while stratified charge combustion is realized by setting it in the compression stroke. That is, when the fuel injection timing of in-cylinder injector 110 is set in the compression stroke, a rich air-fuel mixture can be established locally around the spark plug, so that a lean air-fuel mixture in the combustion chamber as a whole is ignited to realize the stratified charge combustion. Even if the fuel injection timing of in-cylinder injector 110 is set in the intake stroke, stratified charge combustion can be realized if it is possible to provide a rich air-fuel mixture locally around the spark plug.

As used herein, the stratified charge combustion includes both the stratified charge combustion and semi-stratified charge combustion as detailed below. In the semi-stratified charge combustion, intake manifold injector 120 injects fuel in the intake stroke to generate a lean and homogeneous air-fuel mixture in the whole combustion chamber, and then in-cylinder injector 110 injects fuel in the compression stroke to generate a rich air-fuel mixture locally around the spark plug, so as to improve the combustion state. Such semi-stratified charge combustion is preferable in the catalyst warm-up operation for the following reasons. In the catalyst warm-up operation, it is necessary to considerably retard the ignition timing and maintain a favorable combustion state (idle state) so as to cause a high-temperature combustion gas to reach the catalyst. Further, a certain quantity of fuel needs to be supplied. If the stratified charge combustion is employed to satisfy these requirements, the quantity of the fuel will be insufficient. If the homogeneous combustion is employed, the retarded amount for the purpose of maintaining favorable combustion is small as compared with the case of stratified charge combustion. For these reasons, the above-described semi-stratified charge combustion is preferably employed in the catalyst warm-up operation, although either of stratified charge combustion and semi-stratified charge combustion may be employed.

Further, in the engine explained in conjunction with FIGS. 10-13, the fuel injection timing of in-cylinder injector 110 is preferably set in the compression stroke for the following reasons. It should be noted that, in engine 10 as described above, the fuel injection timing of in-cylinder injector 110 is set in the intake stroke in a basic region corresponding to the almost entire region (here, the basic region refers to the region other than the region where semi-stratified charge combustion is carried out with fuel injection from intake manifold injector 120 in the intake stroke and fuel injection from in-cylinder injector 110 in the compression stroke, which is carried out only in the catalyst warm-up state). The fuel injection timing of in-cylinder injector 110, however, may be set temporarily in the compression stroke for the purpose of stabilizing combustion, for the following reasons.

When the fuel injection timing of in-cylinder injector 110 is set in the compression stroke, the air-fuel mixture is cooled by the injected fuel while the temperature in the cylinder is relatively high. This improves the cooling effect and, hence, the antiknock performance. Further, when the fuel injection timing of in-cylinder injector 110 is set in the compression stroke, the time from the fuel injection to the ignition is short, which ensures strong penetration of the injected fuel, so that the combustion rate increases. The improvement in antiknock performance and the increase in combustion rate can prevent variation in combustion, and thus, combustion stability is improved.

Furthermore, in the off-idle state (when the idle switch is off, and the accelerator pedal is being pressed down), the DI ratio map for the warm state as shown in FIG. 10 or 12 may be used (i.e., in-cylinder injector 10 may be used regardless of the cold state and the warm state) irrelevant to the temperature of engine 10 (i.e., in both the warm state and the cold state of engine 10).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus of a vehicle including, as its driving-force sources, an electric motor and an internal combustion engine that includes first fuel injection means for directly injecting fuel into a cylinder and second fuel injection means for injecting fuel into an intake manifold, said control apparatus comprising:

vehicle speed determination means for determining, when a request to operate said internal combustion engine is made, whether or not the vehicle speed is lower than a predetermined speed,
wherein the vehicle speed is based only on an output of said electric motor as said driving force; and first fuel injection control means for controlling, when said vehicle speed determination means determines that said vehicle speed is lower than said predetermined speed, fuel injection ratio between said first fuel injection means and said second fuel injection means with respect to a total fuel injection quantity of said internal combustion engine, so as to inject the total fuel quantity from said second fuel injection means.

2. The control apparatus of the vehicle according to claim 1, further comprising:

temperature determination means for determining whether or not the temperature of said first fuel injection means is higher than a predetermined temperature; and second fuel injection control means for setting, when said temperature determination means determines that the temperature of said first fuel injection means is higher than said predetermined temperature, said fuel injection ratio on behalf of said first fuel injection control means, wherein said second fuel injection control means sets said fuel injection ratio so as to inject at least a part of said total fuel injection quantity from said first fuel injection means.

3. The control apparatus of the vehicle according to claim 2, wherein said predetermined temperature is set in consideration of a risk of deposit build-up of said first fuel injection means.

4. The control apparatus of the vehicle according to claim 2, wherein said vehicle further includes:
a fuel tank storing fuel;
a first fuel pump drawing in the fuel stored in said fuel tank and discharging the fuel at a predetermined pressure corresponding to a fuel injection pressure from said second fuel injection means; and
a second fuel pump drawing in the fuel discharged from said first fuel pump and increasing said predetermined pressure to discharge the fuel at the increased pressure, and
fuel injection from said first fuel injection means according to said second fuel injection control means is carried out at said predetermined pressure in a state where said second fuel pump is stopped.

5. The control apparatus of the vehicle according to claim 1, further comprising:

temperature determination means for determining whether or not said first fuel injection means has its temperature that is higher than a predetermined temperature; and combustion stop means for forcing fuel injection from said first fuel injection means and said second fuel injection means to stop, when said temperature determination means determines that said first fuel injection means has its temperature that is higher than said predetermined temperature.

6. The control apparatus of the vehicle according to claim 5, wherein said predetermined temperature is set in consideration of a risk of deposit build-up of said first fuel injection means.

7. A control apparatus of a vehicle including, as its driving-force sources, an electric motor and an internal combustion engine that includes a first fuel injection mechanism directly injecting fuel into a cylinder and a second fuel injection mechanism injecting fuel into an intake manifold, said control apparatus comprising:

a vehicle speed determination portion determining, when a request to operate said internal combustion engine is made, whether or not the vehicle speed is lower than a predetermined speed,
wherein the vehicle speed is based only on an output of said electric motor as said driving force; and a first fuel injection control portion controlling, when said vehicle speed determination portion determines that said vehicle speed is lower than said predetermined speed, fuel injection ratio between said first fuel injection mechanism and said second fuel injection mechanism with respect to a total fuel injection quantity of said internal combustion engine, so as to inject the total fuel quantity from said second fuel injection mechanism.

8. The control apparatus of the vehicle according to claim 7, further comprising:

a temperature determination portion determining whether or not the temperature of said first fuel injection mechanism is higher than a predetermined temperature; and a second fuel injection control portion setting, when said temperature determination portion determines that the temperature of said first fuel injection mechanism is higher than said predetermined temperature, said fuel injection ratio on behalf of said first fuel injection control portion, wherein said second fuel injection control portion sets said fuel injection ratio so as to inject at least a part of said total fuel injection quantity from said first fuel injection mechanism.

9. The control apparatus of the vehicle according to claim 8, wherein said predetermined temperature is set in consideration of a risk of deposit build-up of said first fuel injection mechanism.

10. The control apparatus of the vehicle according to claim 8, wherein said vehicle further includes:
a fuel tank storing fuel;
a first fuel pump drawing in the fuel stored in said fuel tank and discharging the fuel at a predetermined pressure corresponding to a fuel injection pressure from said second fuel injection mechanism; and
a second fuel pump drawing in the fuel discharged from said first fuel pump and increasing said predetermined pressure to discharge the fuel at the increased pressure, and
fuel injection from said first fuel injection mechanism according to said second fuel injection control portion is carried out at said predetermined pressure in a state where said second fuel pump is stopped.

11. The control apparatus of the vehicle according to claim 7, further comprising:

a temperature determination portion determining whether or not said first fuel injection mechanism has its temperature that is higher than a predetermined temperature; and a combustion stop portion forcing fuel injection from said first fuel injection mechanism and said second fuel injection mechanism to stop, when said temperature determination portion determines that said first fuel injection mechanism has its temperature that is higher than said predetermined temperature.

12. The control apparatus of the vehicle according to claim 11, wherein said predetermined temperature is set in consideration of a risk of deposit build-up of said first fuel injection mechanism.

13. A control apparatus of a vehicle including, as its driving-force sources, an electric motor and an internal combustion engine that includes a first fuel injection mechanism for directly injecting fuel into a cylinder and a second fuel injection mechanism for injecting fuel into an intake manifold, said control apparatus determining, when a request to operate said internal combustion engine is made, whether or not the vehicle speed is lower than a predetermined speed, the vehicle speed based only on an output of said electric motor as said driving force, and when determining that said vehicle speed is lower than said predetermined speed, setting fuel injection ratio between said first fuel injection mechanism and said second fuel injection mechanism with respect to a total fuel injection quantity of said internal combustion engine, so as to inject the total fuel quantity from said second fuel injection mechanism.

* * * * *